United States Patent
Lei et al.

(10) Patent No.: US 7,430,500 B2
(45) Date of Patent: Sep. 30, 2008

(54) METHOD AND DEVICE FOR NUMERICAL ANALYSIS OF FLOW FIELD OF INCOMPRESSIBLE VISCOUS FLUID, DIRECTLY USING V-CAD DATA

(75) Inventors: Kangbin Lei, Wako (JP); Masako Iwata, Wako (JP); Ryutaro Himeno, Wako (JP); Kiwamu Kase, Wako (JP)

(73) Assignee: Riken, Saitama (JP)

( * ) Notice: Subject to any disclaimer, the term of this patent is extended or adjusted under 35 U.S.C. 154(b) by 277 days.

(21) Appl. No.: 10/540,861

(22) PCT Filed: Dec. 12, 2003

(86) PCT No.: PCT/JP03/15971

§ 371 (c)(1),
(2), (4) Date: Jun. 27, 2005

(87) PCT Pub. No.: WO2004/061723

PCT Pub. Date: Jul. 22, 2004

(65) Prior Publication Data

US 2006/0089803 A1    Apr. 27, 2006

(30) Foreign Application Priority Data

Dec. 27, 2002    (JP)    ............................. 2002-379214

(51) Int. Cl.
*C06G 7/48*    (2006.01)
(52) U.S. Cl. .................. 703/9; 703/5; 703/10; 702/12; 702/50; 702/100; 73/1.57; 73/12.08; 73/53.04
(58) Field of Classification Search .................. 712/11; 700/197; 702/50; 703/9, 6, 2; 347/19, 16; 73/152.18

See application file for complete search history.

(56) References Cited

U.S. PATENT DOCUMENTS 5,740,463 A * 4/1998 Oshima et al. ................. 712/11

(Continued)

FOREIGN PATENT DOCUMENTS

JP    2002-230054    8/2002

(Continued)

OTHER PUBLICATIONS

Murray Rudman□□Volume-Tracking Method for Interfacial Flow Calculation□□International Journal for Numerical Methods in Fluid, vol. 24, pp. 671-691, 1997.*

(Continued)

*Primary Examiner*—Hugh Jones
*Assistant Examiner*—Cuong V Luu
(74) *Attorney, Agent, or Firm*—Griffin & Szipl, P.C.

(57) ABSTRACT

A method including: a dividing step (A) of dividing external data into a plurality of cells (13) having boundaries orthogonal to each other, the external data including boundary data of an object which contacts incompressible viscous fluid; a cell classifying step (B) of classifying the divided cells into an internal cell (13a) positioned inside or outside the object and a boundary cell (13b) including the boundary data; a cut point determining step (C) of determining cut points in ridges of the boundary cell on the basis of the boundary data; a boundary face determining step (D) of determining a polygon connecting the cut points to be cell internal data for the boundary face; and a analyzing step (E) of applying a cut cell finite volume method combined with a VOF method to a boundary of a flow field to analyze the flow field.

13 Claims, 19 Drawing Sheets

U.S. PATENT DOCUMENTS 6,161,057 A * 12/2000 Nakano ............... 700/197
6,405,142 B1 * 6/2002 Ogawa et al. ............ 702/50
7,088,363 B2 8/2006 Kase et al.

OTHER PUBLICATIONS

David Trebotich and Phillip Colella□□A Projection Method for Incompressible Viscous Flow on Moving Quadrilateral Grid□□Journal of Computational Physics 166, 191-217, 2001.*

Suho Shin and Woo Il Lee□□Finite Moving Element Analysis of Incompressible Viscous Flow with Moving Free Surface by Selective Volume of Fluid Method□□International Journal of Heat and Fluid Flow 21, 197-206, 2000.*

Kela Ajay□□Hierarchical Octree Approximations for Boundary Representation-Based Geometric Models□□Computer Aided Design, vol. 21 No. 6 Jul./Aug. 1989 0010-4485/89/060355-08 pp. 355-362□□1989 Butterworth & Co (Publishers) Ltd.*

E.M. Saiki et al., "Numerical Simulation of a Cylinder in Uniform flow: Application of a Virtual Boundary Method", 1996, Journal of Computational Physics 123, pp. 450-465.

Yabe Takashi et al., 1999, "Solid-Liquid-Gas Unification Solving Method and CIP Method", Journal of Japan Society of Computational Fluid Dynamics, 7, pp. 103-114.

T. Ye, et al., "A Cartesian Grid Method for Viscous Incompressible Flows with Complex Immersed Boundaries", University of Fla., 1999, AIAA-99-3312, pp. 547-557.

Akira Nakano et al., Numerical Simulation of Compressive . . . the Cartesian Grid System, Transactions of Japan Society of Mechanical Engineers, 1995, 61B-592, pp. 4319-4326.

Osamu Ichikawa et al., "Computation of the Flow Field . . . Using Cartesian Grid", Trans. of Japan Society of Mechanical Engineers, 68B-669, pp. 1329-1336.

BingHu Piao et al., "Cartesian Grid Method for Incompressible Viscous Fluid Flow", 2000, Journ. of Japan Soc. of Fluid Mechanics, 19, pp. 37-46.

K. Ono et al., "An Application of Voxel Modeling Approach to Prediction of Engine Cooling Flow", Soc. of Automotive Engineers of Japan, Spring Convention, No. 984, pp. 165-168.
http://kuwahara.isas.ac.jp/index.html.

S. Teramoto et al., "Flow Simulation around Three-Dimensional Objects Using a Cartesian Grid Method", 1998, Proc. of 12th Computational Fluid Dynamics Symposium, 299-300.

J.J. Quirk, "An Alternative to Unstructured Grids for Computing Gas Dynamic Flows Around Arbitrarily Complex Two-Dimensional Bodies", Computers Fluids, 23, pp. 125-142.

S.L. Karman, Jr., "Splitflow: A 3D Unstructured Cartesian/Prismatic Grid, CFD Code for Complex Geometries", 1995, 33rd Aerospace Sciences Mtg. and Exh. AIAA 95-0343, pp. 1-16.

C. W. Hirt et al., "Volume of Fluid (VOF) Method for the Dynamics of Free Boundaries", Journ. of Comput. Phys. 39, 1981, pp. 201-225.

C. W. Hirt et al., "Calculating Three-Dimensional Flows Around Structures and over Rough Terrain", Journ. Comput. Phys. 10, 1972, pp. 324-340.

Teshima Kase, "Volume Cad Development", Riken Symposium Integrated Vol. CAD System Research, 1st Meeting, 2001, pp. 6-11.

I. Toyoda et al., "Analysis of Flow Around a Circular Cylinder Using Adaptive Cartesian Mesh Method", 13th Computational Fluid Dynamics Symposium, 1999, F03-1, CD-ROM.

H. Matsumiya et al., "Numerical Simulation of 2D Flow Around a Circular . . . Finite-Difference Method", Trans. of Japan Soc. of Mech. Engineers, 1993, 59B-566, pp. 2937-2943.

R. Bouard et al., "The Early Stage of Development of the wake behind an impulsively started cylinder . . . ", Journ. Fluid Mech., 1980, 101-3, pp. 583-607.

S. Okamoto et al., "Fluid Force Acting on Two-Dimensional Circular Cylinder in Lock-In Phenomenon", JSME International Journ., 2002, B45, No. 4, pp. 850-856.

N. Kondo, "Numerical Simulation for Aerodynamic Behaviors of a Circular Cylinder", 15th Computational Fluid Dynamics Symposium, 2001, E09-2, CD-ROM.

* cited by examiner

PRIOR ART 0 degree 10 degrees 45 degrees

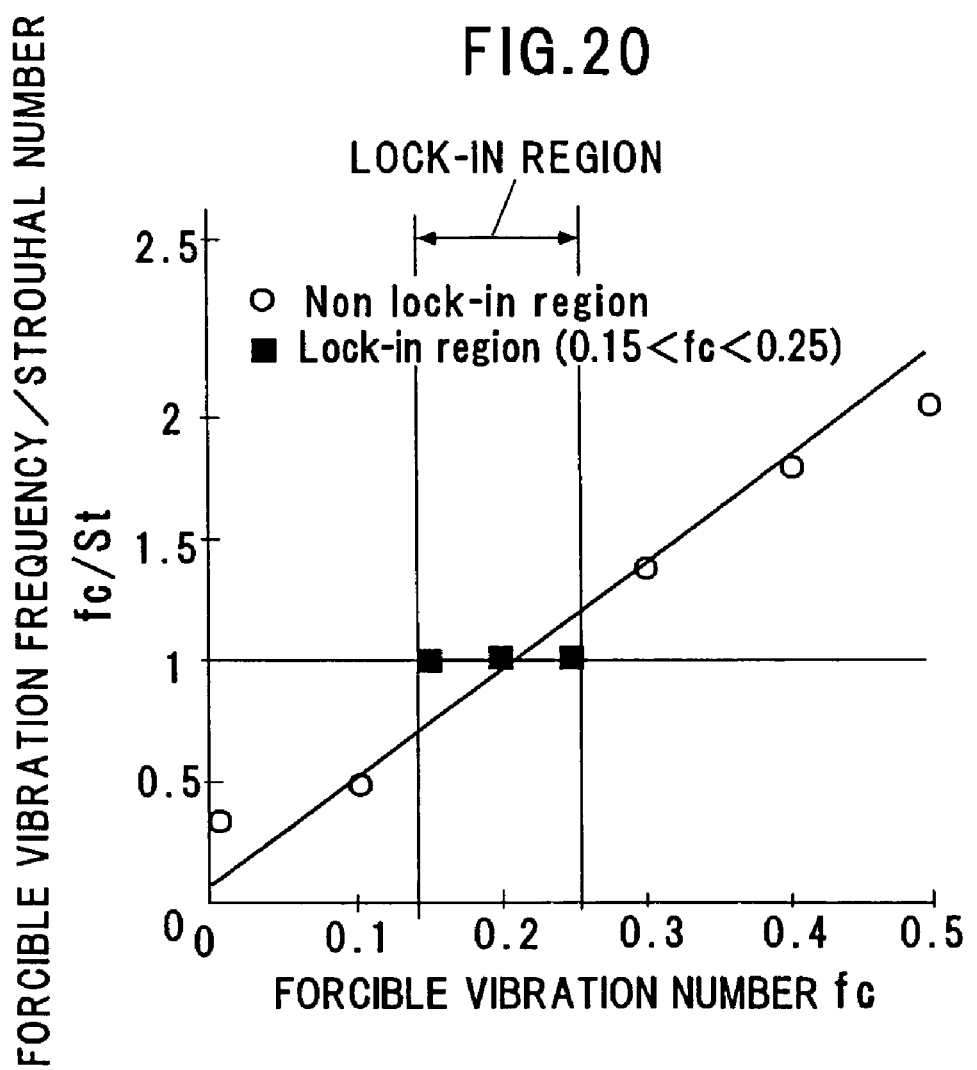

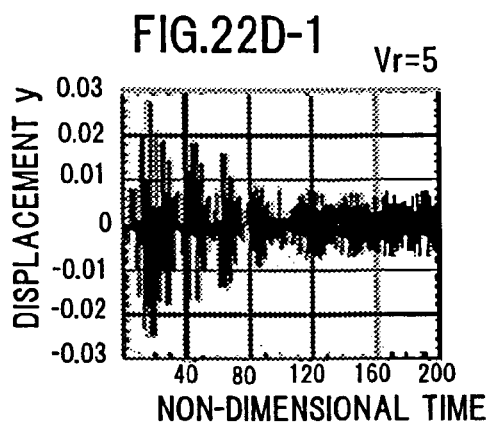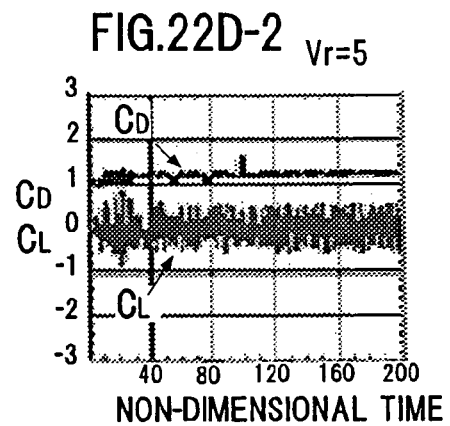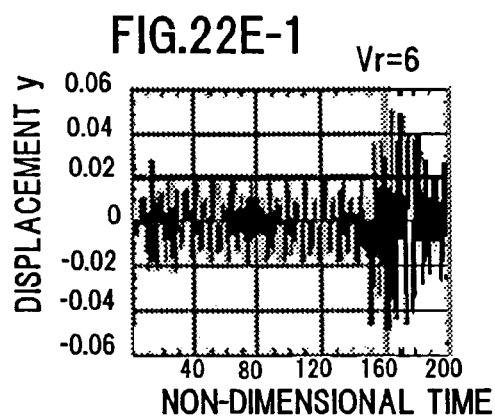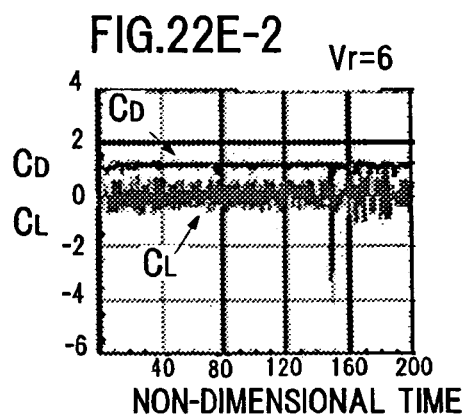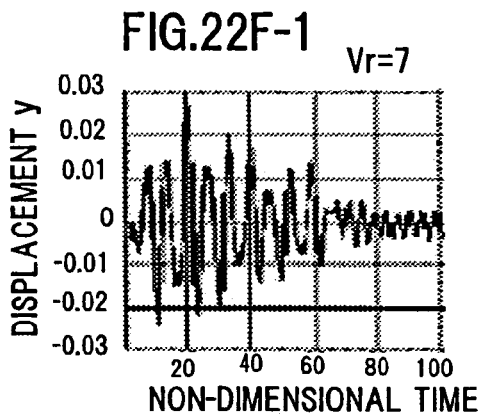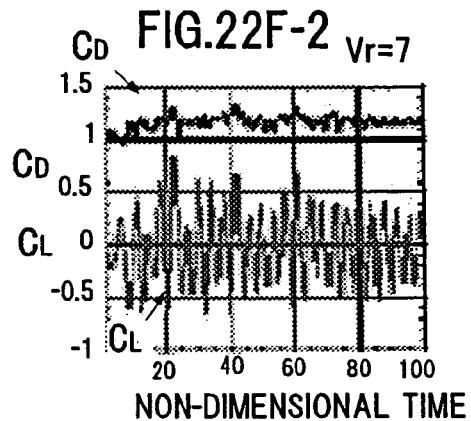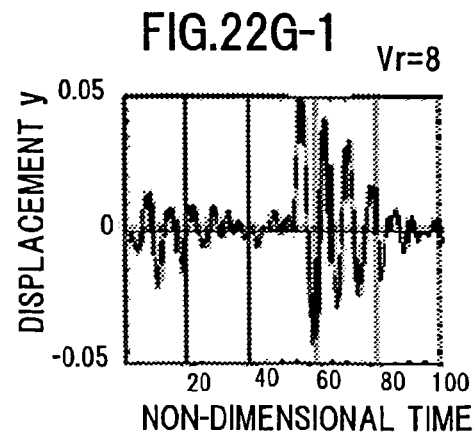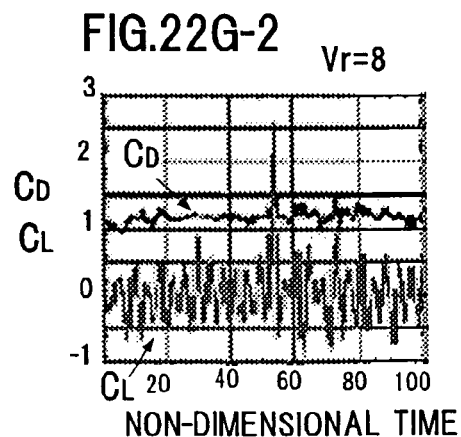

METHOD AND DEVICE FOR NUMERICAL ANALYSIS OF FLOW FIELD OF INCOMPRESSIBLE VISCOUS FLUID, DIRECTLY USING V-CAD DATA

This is a National Phase Application in the United States of International Patent Application No. PCT/JP2003/015971, filed Dec. 12, 2003, which claims priority on Japanese Patent Application No. 2002-379214, filed Dec. 27, 2002. The entire disclosures of the above patent applications are hereby incorporated by reference.

BACKGROUND OF THE INVENTION

1. Field of the Invention

The present invention relates to a method and device for numerical analysis of a flow field of incompressible viscous fluid. This numerical analysis directly uses V-CAD data that have substantial data including shape data and physical quantity data integrated into each other.

2. Description of the Related Art

Patent Literature 1 discloses a method for storing substantial data. In this method, substantial data including shape data and physical quantity data that are integrated into each other can be stored with a small memory. Thereby, it is possible to manage the shape, the structure, the physical property and the history of an object in an integrated fashion. Further, it is possible to manage the data on a series of processes from designing to assembling, testing and evaluating in the same data so that CAD and a simulation can be integrated.

[Patent Literature 1]
Laid-Open Patent Publication No. 2002-230054

As shown in FIG. 1, the method for storing substantial data including integrated shape data and physical property data of Patent Literature 1 includes an external data input step (A1), an oct-tree division step (B1), and a cell data storing step (C1). At the external data input step (A1), external data 12 including boundary data of a target object that is obtained at an external data obtaining step S1 are input to a computer or the like that stores the method. At the oct-tree division step (B1), the external data 12 is divided by oct-tree division into rectangular parallelepiped cells 13 having boundary surfaces orthogonal to each other. At the cell data storing step (C1), various physical property values are stored for each cell.

In the method of Patent Literature 1, the external data having shape data of the object is divided by oct-tree division into rectangular parallelepiped cells having boundary surfaces orthogonal to each other, and various physical property values are stores for each cell. The each divided cells are classified into an internal cell and a boundary cell. The internal cell is positioned inside or outside the target object, and the boundary cell includes the boundary. The internal cell has at least one kind of physical property value as attribute, and the boundary cell has at least two kinds of physical property values for the inside and the outside of the target object.

The data treated in this method is called "V-CAD data", and a simulation using this data is called "Volume Simulation" or "V-Simulation". In FIG. 1, the reference numeral 14 designates V-CAD data.

CFD (Computational Fluid Dynamics) has been gradually put into practical use. Accompanying this, grid generation requires more effort and time, and in the case of a complicated shape, the grid generation requires more time than the computation does. For this reason, fluid analysis using an orthogonal grid attracts attention. The fluid analysis using an orthogonal grid is described in Non-Patent Literatures 1 through 17. The experimental result on a flow around a forcibly oscillated circular cylinder" is described in Non-Patent Literatures 18. Calculation result by an ALE finite element method for self-excited oscillation caused by vortex generation from a circular cylinder is described in Non-Patent Literature 19.

[Non-Patent Literature 1]
Saiki, E. M., Biringen, S., 1996, Numerical Simulation of a Cylinder in Uniform flow: Application of a Virtual Boundary Method, J. Comput. Phys. 123, 450-465.

[Non-Patent Literature 2]
Yabe Takashi et al, 1999, Solid-Liquid-Gas Unification Solving Method and CIP Method, Journal of Japan Society of Computational Fluid Dynamics, 7, 103-114.

[Non-Patent Literature 3]
Ye, T., Mittal, R., Udaykumar, H. S., & Shvy, W., 1999, A Cartesian Grid Method for Viscous Incompressible Flows with Complex Immersed Boundaries, AIAA-99-3312, 545-557.

[Non-Patent Literature 4]
Nakano Akira, Shimomura Nobuo, Satobuka Nobuyuki, 1995, Numerical Simulation of compressive Viscous Flows around an Arbitrary Shape Body Using Cartesian Grid System, Transactions of Japan Society of Mechanical Engineers, 61B-592, 4319-4326.

[Non-Patent Literature 5]
Ichikawa Osamu, Fujii Kozo, 2002, Computation of the Flow Field around Arbitrary Three-Dimensional Body Geometry Using Cartesian Grid, Transactions of Japan Society of Mechanical Engineers, 68B-669, 1329-1336.

[Non-Patent Literature 6]
PIAO Binghu, KURODA Shigeaki, 2000, Cartesian grid method for incompressible Viscous Fluid Flow, Journal of Japan Society of Fluid Mechanics, 19, 37-46.

[Non-Patent Literature 7]
Ono, K., Tomita, N., Fujitani, K., & Himeno, R., 1998, An Application of Voxel Modeling Approach to Prediction of Engine Cooling Flow, Society of Automotive Engineers of Japan, Spring Convention, No. 984, 165-168.

[Non-Patent Literature 8]
http://kuwahara.isas.ac.jp/index.html

[Non-Patent Literature 9]
Teramoto Susumu, Fuji Kozo, 1998, Flow Simulation around Three-Dimensional Object Using a Cartesian Grid Method, Proceedings of 12$^{th}$ Computational Fluid Dynamics Symposium, 299-300.

[Non-Patent Literature 10]
Quirk, J. J., 1994, An Alternative to Unstructured Grids for Computing Gas Dynamic Flows Around Arbitrarily Complex Two-Dimensional Bodies, Computers Fluids, 23, 125-142.

[Non-Patent Literature 11]
Karman, S. L. Jr., 1995, SPLITFLOW: A 3D Unstructured Cartesian/Prismatic Grid (12) ynamics of CFD Code for Complex Geome-tries, AIAA 95-0343.

[Non-Patent Literature 12]
Hirt, C. W., & Nichols, B. D., 1981, Volume of Fluid (VOF) Method for the D Free Boundaries, J. Comput. Phys. 39, 201-225.

[Non-Patent Literature 13]

Hirt, C. W., & Cook, J. L., 1972, Calculating Three-dimensional Flows Around Structures and Over Rough Terrain, J. Comput. Phys. 10, 324-340.

[Non-Patent Literature 14]

Kase, Teshima, 2001, Volume CAD Development, Riken Symposium, Integrated Volume CAD System Research, The First Meeting, 6-11.

[Non-Patent Literature 15]

Toyoda, Arakawa, 1999, Analysis of Flow around Circular Cylinder Using Adaptive Cartesian Mesh Method, 13th Computational Fluid Dynamics Symposium, F03-1, CD-ROM,

[Non-Patent Literature 16]

Matsumiya, Koeda, Taniguchi, Kobayashi, 1993, Numerical Simulation of 2D Flow around a Circular Cylinder by Third-Order Upwind Finite Difference Method, Transactions of Japan Society of Mechanical Engineers, 59B-566, 2937-2943.

[Non-Patent Literature 17]

Bouard, R., & Coutanceau, M., 1980, The early stage of development of the wake behind an impulsively started cylinder for 40<Re<10^4, J. Fluid Mech., 101-3, 583-607.

[Non-Patent Literature 18]

Okamoto, S., Uematsu, R., and Taguwa, Y., Fluid force acting on two-dimensional circular cylinder in Lok-in phenomenon, JSME International Journal, B45, No. 4, (2002), 850-856.

[Non-Patent Literature 19]

Kondou, Numerical Simulation for Aerodynamic Behaviors of a Circular Cylinder, 15th Computational Fluid Dynamics Symposium, E09-2, (2001), CD-ROM At present, in the fluid analysis, calculation of even a complicated flow field having a three-dimensional shape becomes possible by using an overlapped grid and unstructured grid method. However, mesh generation comes to occupy a large part of the entire simulation. For this reason, use of an orthogonal grid is desired for a mesh generation method that enables complete automatization.

In numerical analysis on an arbitrary shape in an orthogonal grid system, it is generally difficult to treat an object boundary. Recently, several Cartesian grid methods have been proposed for discretizations near a fluid boundary, and a boundary condition.

Specifically, there are proposed a virtual boundary of Non-Patent Literature 1, CIP (Cubic-Interpolated Propagation) of Non-Patent Literature 2, an immersed boundary method of Non-Patent Literature 3, NPLS (neighboring Point Local collection) of Non-Patent Literature 4, a method of introducing into a differential scheme a distance from the boundary located between the grid points of Non-Patent Literature 5, and a partial boundary adaptive Cartesian grid method of Non-Patent Literature 6.

In these methods, the boundary of the object is strictly treated. However, to that extent, a computation process become more complicated. Accordingly, these methods are not necessarily suitable to a three-dimensional treatment for an arbitrary shape.

On the other hand, in terms of practical use, two methods are promising. One method of the two forms a stepped boundary by using orthogonal grids so as to approximate an object shape (for example, Non-Patent Literature 7 of Ono in Nissan Automobile, Non-Patent Literature of Kuwabara in Computation Fluid Laboratory. The other method treats a boundary shape by introducing a cut cell to improve approximation (for example, Non-Patent Literature 9 of Fujii in Space Laboratory, Non-Patent Literature 10 of Quirk in J. J., NASA.).

However, in the method using a cut cell, since the boundary extends through an arbitrary position in an orthogonal grid, cells neighboring each other on the boundary can greatly differ in size. For this reason, there is a report that viscous flow analysis is difficult in the cut cell orthogonal grid (refer to Non-Patent Literature 11).

When numerical analysis on a flow field of incompressible viscous fluid is performed by using the conventional overlapped grids and the unstructured grid, grid generation cannot be completely automatized. For this reason, the grid generation occupies a large part of entire simulation time, so that it was difficult to reduce simulation time.

Meanwhile, although numerical analysis on a flow field using an orthogonal grid enables the grid generation to be automatized, it is difficult to express the object boundary by using orthogonal cells. As a result, simulation accuracy becomes low. Particularly in the case of numerical calculation on a flow accompanied by the moving boundary, movement distance of the moving boundary is limited to integer multiples of a mesh that has a constant size, so that the calculation can become unstable.

Furthermore, particularly in the cut cell method, the boundary extends through an arbitrary position in an orthogonal grid, so that the cells neighboring each other on the boundary can differ in size, so that viscous flow analysis was difficult in the cut cell orthogonal grid.

SUMMARY OF THE INVENTION

The present invention was made to solve the above problems. That is, it is an object of the present invention to provide a method and a device for numerical analysis of a flow field of incompressible viscous fluid, directly using V-CAD data, by which it is possible to completely automatize grid generation, to easily express an object boundary, and to perform simulation of high precision in a short time by a relatively simple calculation process without causing calculation instability.

According to the present invention there is provided a method for numerical analysis of a flow field of incompressible viscous fluid, directly using V-CAD data, comprising:

a dividing step (A) of dividing external data into a plurality of cells (13) having boundaries orthogonal to each other, the external data including boundary data of an object which contacts incompressible viscous fluid;

a cell classifying step (B) of classifying the divided cells into an internal cell (13a) positioned inside or outside the object and a boundary cell (13b) including the boundary data;

a cut point determining step (C) of determining cut points in ridges of the boundary cell on the basis of the boundary data;

a boundary face determining step (D) of determining a polygon connecting the cut points to be cell internal data for the boundary face; and a analyzing step (E) of applying a cut cell finite volume method combined with a VOF method to a boundary of a flow field to analyze the flow field.

Further, according to the present invention, there is provided a device for numerical analysis of a flow field of incompressible viscous fluid, directly using V-CAD data, comprising:

an input device (2) for inputting external data including boundary data of an object (1) that contacts incompressible viscous fluid;

an external storage device (3) for storing substantial data of shape data and physical property data integrated into each other, and a storage operational program for the substantial data;

an internal storage device (4) and central processing device (5) for executing the storage operational program; and an output device (6) for outputting a result of the execution;

wherein the device divides the external data into a plurality of cells (13) having boundaries orthogonal to each other, classifies the divided cells into an internal cell (13a) positioned inside or outside the object and a boundary cell (13b) including the boundary data, determines cut points in ridges of the boundary cell on the basis of the boundary data, determines a polygon connecting the cut points to be cell internal data for the boundary face, and applies a cut cell finite volume method combined with a VOF method to a boundary of a flow field to analyze the flow field.

Furthermore, according to the present invention, there is provided a program for numerical analysis of a flow field of incompressible viscous fluid, directly using V-CAD data, causing a computer to perform:

a dividing step (A) of dividing external data into a plurality of cells (13) having boundaries orthogonal to each other, the external data including boundary data of an object which contacts incompressible viscous fluid;

a cell classifying step (B) of classifying the divided cells into an internal cell (13a) positioned inside or outside the object and a boundary cell (13b) including the boundary data;

a cut point determining step (C) of determining cut points in ridges of the boundary cell on the basis of the boundary data;

a boundary face determining step (D) of determining a polygon connecting the cut points to be cell internal data for the boundary face;

an analyzing step (E) of applying a cut cell finite volume method combined with a VOF method to a boundary of a flow field to analyze the flow field.

By the method and device of the present invention, it becomes possible to perform simulation of high precision by a relatively simple calculation process, in which accuracy and stability can be obtained, calculation cost is not much required, a grid generation can be automated completely, and an object boundary can be expressed easily.

According to a preferred embodiment of the present invention, the analyzing step (E) comprises:

applying a two-dimensional QUICK interpolation scheme to a convection term for space integral;

applying central difference having precision of a degree of a second order to a diffusion term;

combining the convection term and the diffusion term, and applying Adams-Bashforth method having precision of a degree of a second order to the combined convection term and diffusion term for time marching; and applying an Euler implicit method having precision of a degree of a first order to a pressure gradient term for time marching.

Thereby, it is possible to completely automatize grid generation with stability and discretization precision being maintained.

For a two-dimensional boundary cell, a governing equation in the finite volume method is expressed by a governing equation (7), $$\int_{V_{i,j}} \int \frac{\partial \vec{u}}{\partial t} dV = - \int_{V_{i,j}} \int div(\vec{u} \otimes \vec{u}) dV - \qquad (7)$$

$$\int_{V_{i,j}} \int div(p\vec{I}) dV + \frac{1}{Re} \int_{V_{i,j}} \int div(grad(\vec{u})) dV.$$

This equation (7) is obtained by integrating the equation (6) with a fluid part of the two-dimensional boundary cell being set as a control volume (CV) Vi,j. The equation (6) is a tensor divergence type rewritten from the basic governing equation (1) for the incompressible viscous fluid so that equation (7) can satisfy the basic governing equation (1) for the incompressible viscous fluid.

The convection term, the pressure gradient term and the diffusion term in the governing equation of the finite volume method are expressed by the equations (8), (9) and (10), respectively, convection term:

$$\int_{V_{i,j}} \int div(\vec{u} \otimes \vec{u}) dV = \oiint_{S_{1-5}} (\vec{u} \otimes \vec{u}) \cdot \vec{n} dS = \qquad (8)$$

$$\sum_{m=1-5} (\vec{u} \otimes \vec{u})_m \cdot \vec{n} \delta S_m = [\Delta y(B_{i,j} u_{i,j}^{(x)} u_{i,j} - B_{i-1,j} u_{i-1,j}^{(x)} u_{i-1,j}) +$$

$$\Delta x(A_{i,j} u_{i-1/2,j+1/2}^{(y)} v_{i,j} - A_{i,j-1} u_{i-1/2,j-1/2}^{(y)} v_{i,j-1})]\vec{i} +$$

$$[\Delta y(B_{i,j} v_{i+1/2,j-1/2}^{(x)} u_{i,j} - B_{i-1,j} v_{i-1/2,j-1/2}^{(x)} u_{i-1,j}) +$$

$$\Delta x(A_{i,j} v_{i,j}^{(y)} v_{i,j} - A_{i,j-1} v_{i,j-1}^{(y)} v_{i,j-1})]\vec{j} |$$

only no-slip on wall pressure gradient term:

$$\int_{V_{i,j}} \int div(p\vec{I}) dV = \oiint_{S_{1-5}} (p\vec{I}) \cdot \vec{n} dS = \sum_{m=1-5} p_m \vec{I} \cdot \vec{n} \delta S_m = \qquad (9)$$

$$\Delta y[B_{i,j} p_{i+1/2,j} - B_{i-1,j} p_{i-1/2,j} - p_p(B_{i,j} - B_{i-1,j})]\vec{i} +$$

$$\Delta x[A_{i,j} p_{i,j+1/2} - A_{i,j-1} p_{i,j-1/2} - p_p(A_{i,j} - A_{i,j-1})]\vec{j}$$

diffusion term:

$$\int_{V_{i,j}} \int div(grad(\vec{u})) dV = \oiint_{S_{1-5}} grad(\vec{u}) \cdot \vec{n} dS = \qquad (10)$$

$$\sum_{m=1-5} grad(\vec{u})_m \cdot \vec{n} \delta S_m = [\Delta y(B_{i,j} grad(u)_{i+1/2,j}^x -$$

$$B_{i-1,j} grad(u)_{i-1/2,j}^x - (B_{i,j} - B_{i-1,j}) grad(u)_p^x) +$$

$$\Delta x(A_{i,j} grad(u)_{i,j+1/2}^y - A_{i,j-1} grad(u)_{i,j-1/2}^y -$$

$$(A_{i,j} - A_{i,j-1}) grad(u)_p^y)]\vec{i} + [\Delta y(B_{i,j} grad(v)_{i+1/2,j}^x -$$

$$B_{i-1,j} grad(v)_{i-1/2,j}^x - (B_{i,j} - B_{i-1,j}) grad(v)_p^x) +$$

$$\Delta x(A_{i,j} grad(v)_{i,j+1/2}^y - A_{i,j-1} grad(v)_{i,j-1/2}^y -$$

$$(A_{i,j} - A_{i,j-1}) grad(v)_p^y)]\vec{j}.$$

The equations (8), (9), and (10) include object boundary data in which the boundary connects the cut points of the ridges so that it becomes possible to perform numerical analysis on the incompressible viscous fluid in the flow field at the boundary.

When a no-slip boundary condition is used for a solid boundary, integral is performed on the solid boundary with the convection term being zero, a value of a middle point P of a cut line segment being used as an average for the pressure gradient term and the diffusion term, and a space integral is performed with areas fractions being applied to all of the terms.

Thereby, it is possible to maintain complete automatization of the Cartesian grid, and strictly satisfy the conservation law by the control volume in the fluid calculation.

The boundary cell having the parameter smaller than a threshold value of VOF=0.01 is regarded as a complete solid, for the boundary cell having the parameter larger than the threshold value, a definition point for the parameter calculated in a cut cell is set at a center of the boundary cell, and a definition point for a parameter in a ridge is set at a center of a cell ridge, and a parameter at a middle point of a line segment 4 is calculated by a linear interpolation.

Also in this manner, it is possible to maintain complete automatization of the Cartesian grid, and strictly satisfy the conservation law by the control volume in the fluid calculation.

A drag force (in a flow direction) and a lift force (in a direction vertical to the flow) acting on the object are expressed by equations (12) and (13), drag force:

$$F_x = F_D = \int_V \int \left( \frac{\partial \sigma_{xx}}{\partial x} + \frac{\partial \sigma_{xy}}{\partial y} \right) dx\, dy = \quad (12)$$

$$\int_V \int \left( \frac{\partial \sigma_{xx}}{\partial x} \right) dx\, dy + \int_V \int \left( \frac{\partial \sigma_{xy}}{\partial y} \right) dy\, dx =$$

$$\oint_S \sigma_{xx} ds + \oint_S \sigma_{xy} ds = \int_{y_1}^{y_2} \left( \sigma_{xx}|_{f_1(y)} - \sigma_{xx}|_{f_2(y)} \right) dy +$$

$$\int_{x_1}^{x_2} \left( \sigma_{xy}|_{g_1(x)} - \sigma_{xy}|_{g_2(x)} \right) dx \bigg|_{\text{only Cartesian}}$$

lift force:

$$F_y = F_L = \int_V \int \left( \frac{\partial \sigma_{yx}}{\partial x} + \frac{\partial \sigma_{yy}}{\partial y} \right) dx\, dy = \quad (13)$$

$$\int_V \int \left( \frac{\partial \sigma_{yx}}{\partial x} \right) dx\, dy + \int_V \int \left( \frac{\partial \sigma_{yy}}{\partial y} \right) dy\, dx =$$

$$\oint_S \sigma_{yx} ds + \oint_S \sigma_{yy} ds = \int_{y_1}^{y_2} \left( \sigma_{yx}|_{f_1(y)} - \sigma_{yx}|_{f_2(y)} \right) dy +$$

$$\int_{x_1}^{x_2} \left( \sigma_{yy}|_{g_1(x)} - \sigma_{yy}|_{g_2(x)} \right) dx \bigg|_{\text{only Cartesian}}.$$

These equations enable the drag force and the lift force to be calculated easily and accurately in the Cartesian grid.

Preferably, in fluid-structure interaction analysis accompanying a moving boundary, a fluid system and a structure system are separately analyzed each predetermined time interval, and boundary conditions for the fluid system and the structure system are explicitly used.

In this analyzing manner, the calculation process becomes simpler than that in the strong coupling that treats the fluid system and the structure system in an unified manner by coupling. Thereby, the calculation time can be reduced. Further, the movement distance is not restricted to the integer multiples of the constant mesh size, so that avoid the calculation instability.

In analysis on a forcibly vibrated circular cylinder, the circular cylinder is set as one-mass-point and one-degree-of-freedom system such that the circular cylinder is a solid structure elastically supported and vibrating in a direction vertical to the flow, and Y-direction displacement of a center of the circular cylinder is given by the equation (17), and a velocity boundary condition in the Y direction for a surface of the circular cylinder is given by the equation (18), $$y = A \sin(2\pi f_C t) \quad (17)$$

$$v_W = A 2\pi f_C \cos(2\pi f_C t). \quad (18)$$

Furthermore, movement velocity of the vibrating circular cylinder obtained by the equation (18) is changed to be given each calculation time step for the velocity boundary condition on the flow field.

Thereby, it is possible to obtain the analysis result well consistent with the experimental data. For example, (1) the drag force and the lift force acting on the vibrating circular cylinder is larger than those acting on a stationary circular cylinder, (2) the lock-in phenomenon of the frequency of the vortex shedding due to the forcible vibration can be well reproduced at "$0.15 < f_C < 0.25$" around the Strouhal number of 0.2, and (3) the drag force and the lift force increase in the lock-in region.

In analysis on self-induced vibration due to an vortex shedding from the circular cylinder, a vibration equation having a dimension is expressed by the equation (19) or (20), using one-mass-point and one-degree-of-freedom dumper/spring model, $$m \frac{d^2 \tilde{y}}{d t^2} + c \frac{d \tilde{y}}{d t} + k \tilde{y} = \frac{1}{2} \rho U_o^2 D C_L \quad (19)$$

$$\frac{d^2 y}{d t^2} + (4 \pi h f_o) \frac{d y}{d t} + (2 \pi f_o)^2 y = \frac{8h}{Sc} C_L. \quad (20)$$

The movement velocity of the vibrating circular cylinder calculated by the equation (20) is changed to be given each calculation time step for the velocity boundary condition on the flow field.

Initial displacement and initial velocity of the circular cylinder are set to be zero, the lift force is explicitly given by using a current value, and the vibration equation is integral by the Newmark's β method to obtain vibration displacement and vibration velocity of the circular cylinder.

In this analyzing manner, (1) the amplitude of the circular cylinder becomes the largest at the non-dimensional fluid velocity of Vr=4 (characteristic vibration frequency fo=1/4=0.25), (2) the maximum displacement of y gradually increases in the range Vr=2, 3 and 4, and becomes the largest at the point of Vr=4, and (3) then, the maximum displacement of y decreases in a waveform, accompanying increase in Vr. Thus, the result of this analyzing manner is qualitatively consistent with the calculation result of the ALE finite element method.

Other object and advantageous features of the present invention will become apparent from the following description referring to the attached drawings.

BRIEF DESCRIPTION OF DRAWINGS

FIG. 20 shows relation between Strouhal number St expressing vortex shedding and forcible vibration frequency;

FIGS. 22D through 22G show temporal change in displacement y (left drawing), a drag force coefficient $C_D$ and a lift force coefficient $D_L$ (right drawing), at a range of the non-dimensional fluid velocity of Vr=5, 6, 7 and 8.

DESCRIPTION OF THE PREFERRED EMBODIMENTS

In the following, a preferred embodiment of the present invention will be described with reference to the drawings.

Figure 1:
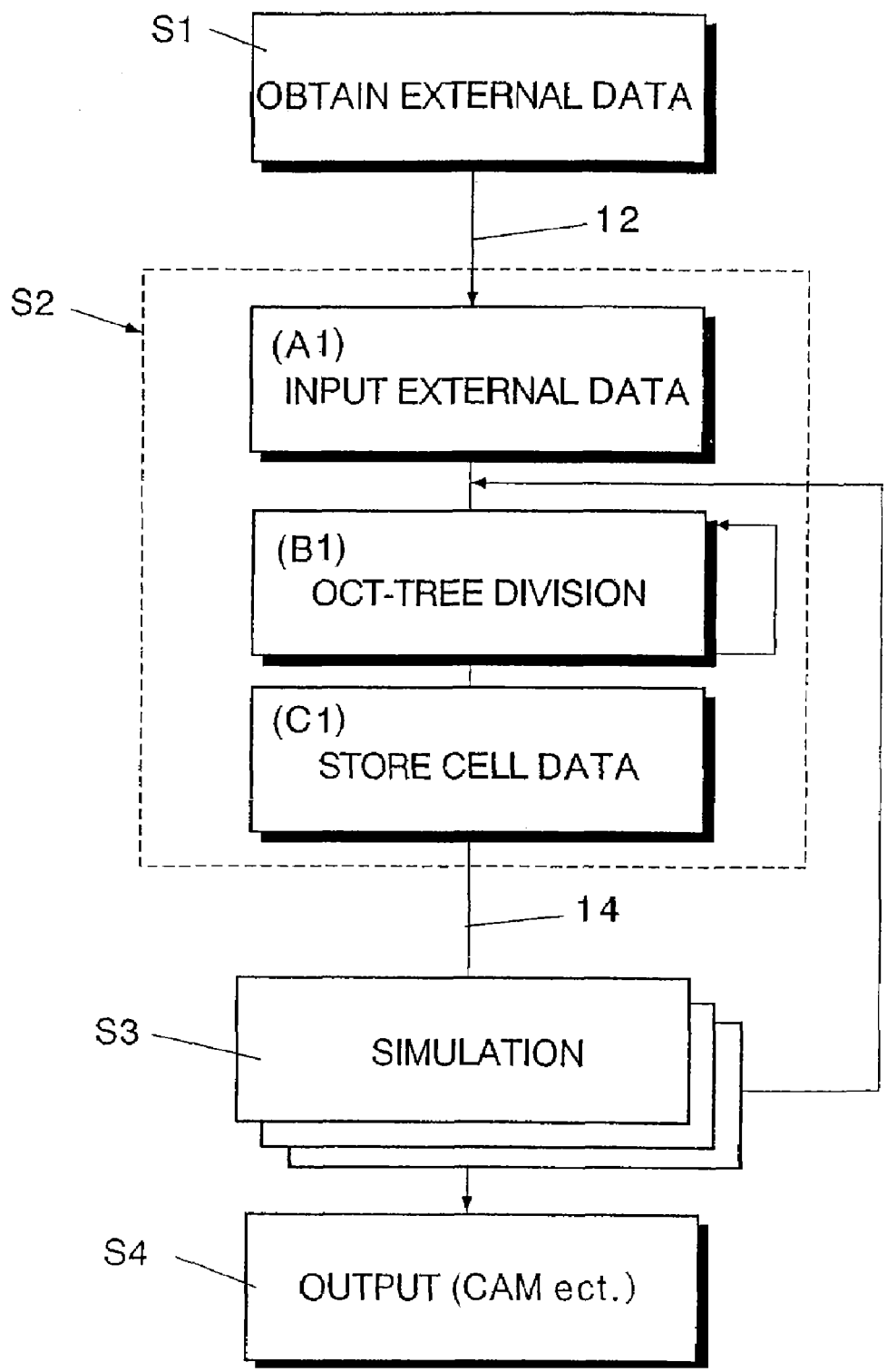
FIG. 1 is a flowchart showing a storage method for substantial data according to the prior application.
Figure 2:
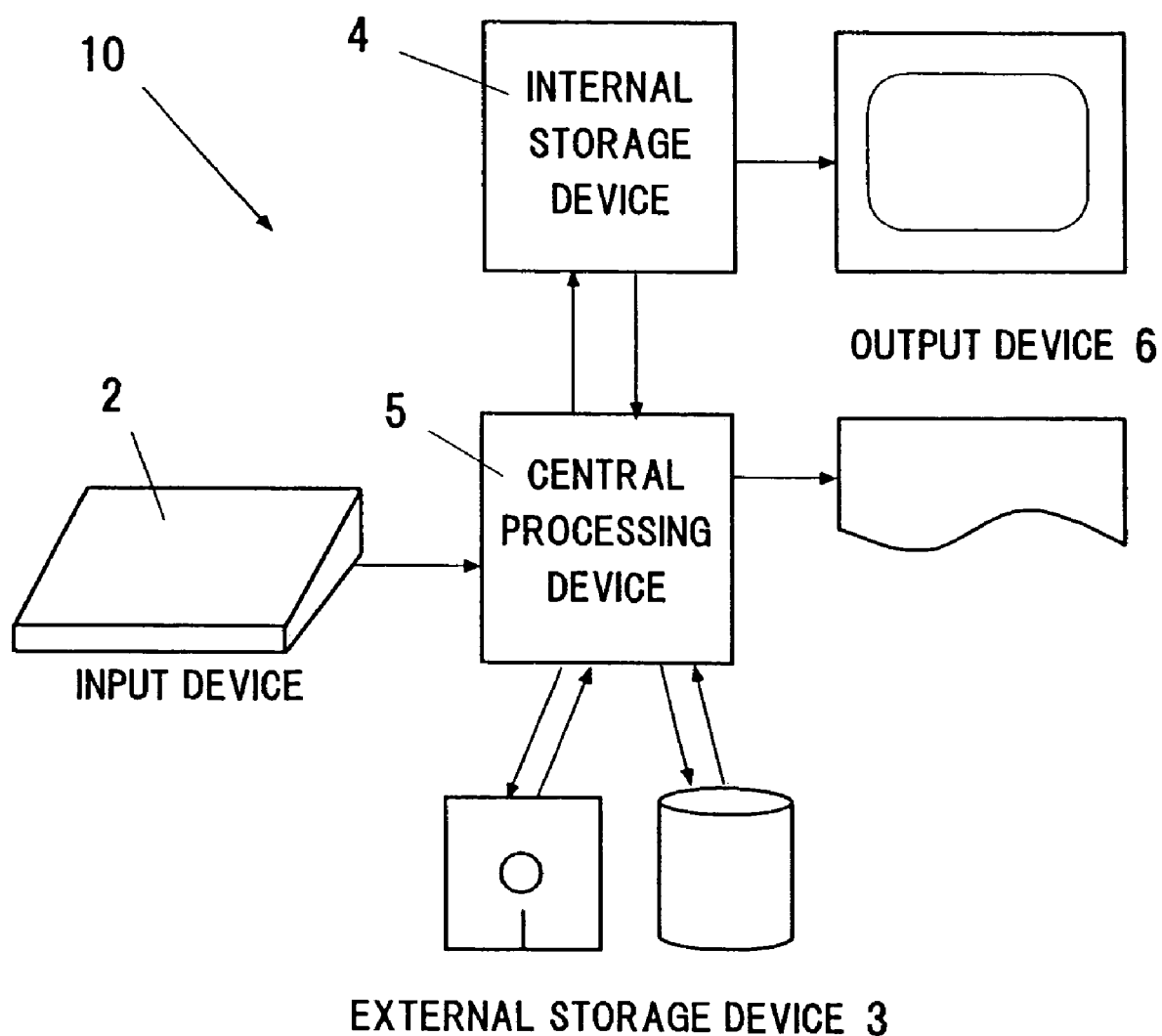
FIG. 2 shows a configuration of a numerical analysis device for implementing a numerical analysis method according to the present invention.

FIG. 2 is a configuration diagram of a numerical analysis device for implementing a numerical analysis method according to the present invention. The numerical analysis device of the present invention includes an input device 2, an external storage device 3, internal storage device 4, a central processing device 5, and an output device 6.

The input device 2 is a keyboard, for example, and inputs external data 12 including shape data of an object 1. The external storage device 3 is a hard disk, a floppy disk, a magnetic tape, a compact disk or the like, stores substantial data constituted by a shape and a physical amount integrated to each other, and stores a storage operational program for the substantial data. The internal storage device 4 is a RAM or a ROM, for example, and stores operational information. The central processing device (CPU) 5 intensively processes the operation, the input, the output and the like, and executes the storage operational program in cooperation with the internal storage device 4. The output device 6 includes a display device and a printer, for example, and outputs the stored substantial data and the executed result of the storage operational program.

The numerical analysis device of the present invention employs the external storage device 3, the internal storage device 4, and central processing device 5 to divide the external data 12 into a plurality of cells having boundary surfaces orthogonal to each other, to classify the respective divided cells into an internal cell 13a positioned inside or outside the object 1 and a boundary cell 13b including boundary data, to find a cut point in a ridge of the boundary cell 13b on the basis of the boundary data, to set as cell internal data the polygon that connects the found cut points, and to perform the analysis by applying to a flow field a VOF method combined with a cut cell finite volume method.

Figure 3:
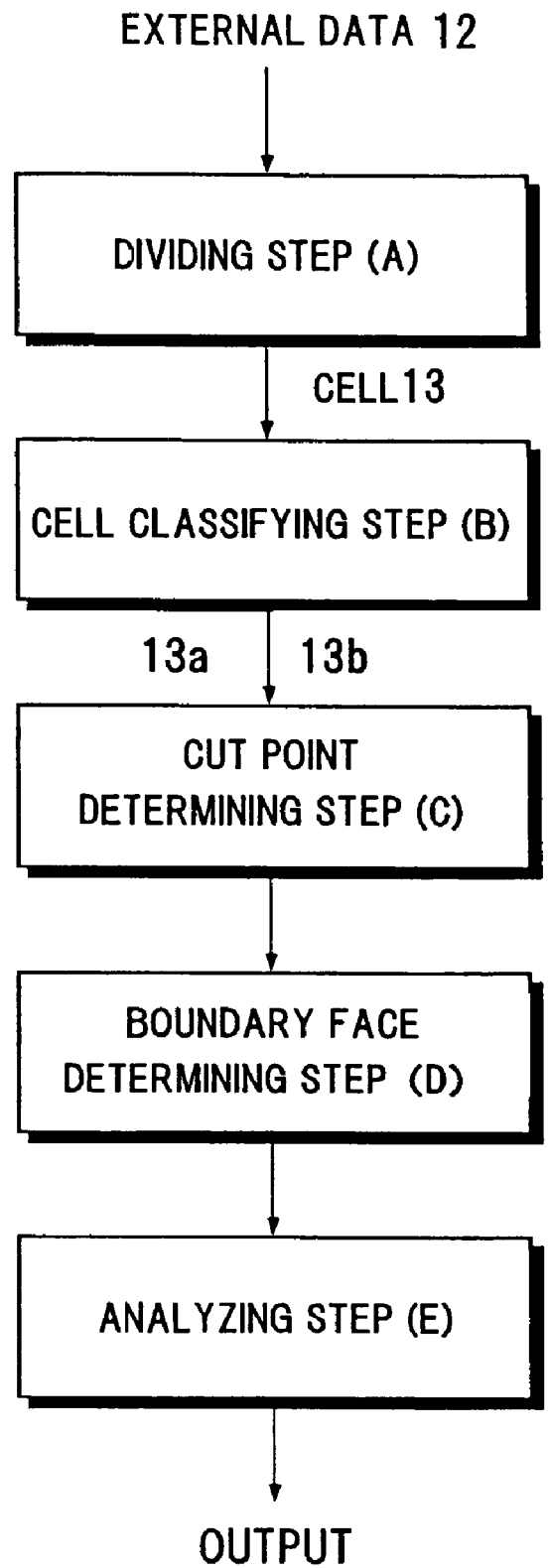
FIG. 3 is a flowchart of the numerical analysis method and a program therefor according to the present invention.

FIG. 3 is a flow diagram showing the numerical analysis method and the program for this method. As shown in FIG. 3, the method and transformation program of the present invention includes a dividing step (A), a cell classifying step (B), a cut point determining step (C), and a boundary face determining step (D), and analyzing step (D).

The external data 12 input from the outside is: polygon data that expresses a polyhedron; a tetrahedron or hexahedron element used in the finite element method; curved surface data used in a three-dimensional CAD or a CG tool; or data that expresses surface of other three-dimensional shape by using information of partial planes and curved surfaces.

Instead of these data (referred to as S-CAD data), the external data 12 may be (1) data directly created by manual input through an interface (V-CAD interface) specific to the V-CAD, (2) digitized surface data by a measurement device, a sensor and a digitizer, (3) volume data including internal information such as voxel data used in the CT scan, the MRI, and generally used in the volume rendering.

At the dividing step (A), the external data 12 is divided into a plurality of cells 13 having boundary surfaces orthogonal to each other. This external data 12 includes boundary data of the object that contacts with incompressible viscous fluid, and is obtained at an external data obtaining step (not shown in the drawing). In the case of a three dimension, this dividing is the oct-tree division, and in the case of a two dimension, this dividing is tetra division.

In other words, at the dividing step (A), a standard rectangular parallelepiped or a rectangle is divided into 8 or 4 cells, and the dividing is recursively repeated until each cell is completely inside or outside the object. This dividing can greatly reduce a data amount compared to the voxel expression.

One area formed by space division is referred to as the cell 13. The cell 13 is a rectangular parallelepiped or a rectangle having boundaries orthogonal to each other. A hierarchical structure, the number of divisions or resolution expresses an area occupied in the apace. Thereby, the object in the space is expressed as the cells of different sizes that are put on top of each other.

At the cell classifying step (B), the respective divided cells are classified into the internal cell 13a and the boundary cell 13b. The internal cell 13a is positioned inside or outside the object, and the boundary cell 13b includes the boundary data.

In other words, the cell positioned completely inside or outside the object that contacts with incompressible viscous fluid is classified into the internal cell 13a (cube) so as to have the maximum size. On the other hand, the cell including the boundary information in the external data 12 is classified into the boundary cell 13b.

At the cut point determining step (C), The cut point between the ridge of the boundary cell 13b and the boundary face is determined on the basis of the boundary data.

At the boundary face determining step (D), the polygon that connects the determined cut points are determined to be the cell internal data of the boundary surface. In the following, the cell that includes the polygon connecting the cut points is referred to as a cut cell.

At the analyzing step (E), the cut cell finite volume method combined with the VOF method is applied to the boundary on the flow field for the internal cell 13a and the boundary cell 13b. Thereby, the numerical analysis is performed on the flow field of the incompressible viscous fluid.

The present invention will be described in more detail.

1. The present invention is aimed at a fluid analysis technique of practical use in a V-CAD program, and provides a method for analyzing an incompressible viscous flow around an arbitrary shape, on the basis of the cut cell (KTC) orthogonal grid. In the present invention, the boundary in the flow field is treated by using the cut cell finite volume method combined with the VOF (Volume of Fluid) method proposed by Hirt et al (refer to Non-Patent Literature 12). According to the method of the present invention, an internal flow that is the flow inside a channel, and an outer flow that is the flow around a circular cylinder are analyzed. The analyzed result was compared to the experimental data, the theoretical solution, and an analyzed result of the conventional method.

2. Basic Equation and Calculation Method 2.1 Basic Equation

Basic governing equations are the Navier Stokes equation (1) and the continuity equation (2) shown in Formula 4.

[Formula 4]

$$\frac{\partial u_i}{\partial t} + \frac{\partial (u_i u_j)}{\partial x_j} = -\frac{\partial p}{\partial x_i} + \frac{1}{Re}\frac{\partial^2 u_i}{\partial x_j} + f_i \quad (1)$$

$$\frac{\partial u_i}{\partial x_i} = 0 \quad (2)$$

In Formula 4, "Re" designates the non-dimensional Reynolds number defined by the characteristic length and the characteristic velocity of the flow field. This Reynolds number Re physically represents the ratio between the inertial force and the viscous force in the flow field. In Formula 4, "u" designates velocity, and "p" designates a pressure. "i=1, 2, 3" and "j=1, 2, 3" designate the respective directions in the orthogonal coordinate system. "i=1, 2, 3" and "j=1, 2, 3" are abbreviated to be "i" and "j" also in the following description. From the equation (1), it is understood that the movement of the incompressible viscous fluid is controlled by only one parameter Re when an external force fi is not considered.

2.2 Calculation Accuracy, Calculation Cost and Calculation Method

Simulation on fluid is one kind of numerical experiment, and always accompanies a certain error. In order to accurately perform the fluid analysis, it is necessary to satisfy the following 4 requirements:

(1) Space resolution that becomes finer by acquiring the minimum length scale (such as a boundary layer, an vortex, a shock wave and a flame surface) of the flow.

(2) A calculation area that becomes larger or the area where an artificial flow, influx/efflux boundary condition and blocking by the wall can be neglected, by sufficiently acquiring the maximum length scale of the flow.

(3) Time and space discretization that enables a truncation error and numerical diffusion to be neglected.

(4) Model suitable to a specific case (wall model, turbulent flow, and combustion model, for example), and a scheme (K-K, QUICK, MUSCL, TVD, and ENO, for example). If a finite difference method is to be used, the grid should be more orthogonal and uniform.

The calculation cost (calculation time and necessary memory) of the fluid analysis can be determined by analysis accuracy required by the calculation method. The fluid analysis of practical use can be sufficiently satisfied by a certain accuracy (accuracy range of normal physics experiment, and accuracy required by a user).

Meanwhile, the flow field is classified into an internal flow, an external flow, and other flows (jet flow, for example). Generally, an analysis area for the external flow is made larger than that for the internal flow. According to the present invention, in terms of practical use, in the case of the external flow, all of the analysis areas are set to be 10D×10D with the characteristic length scale of the flow field being D (=1).

According to the present invention, the finite volume method combined with the difference method is employed. In order to secure a certain level of stability and discretization accuracy, for space integral, two-dimensional QUICK interpolation scheme is applied to the convection term, and the center difference of the second order accuracy is applied to a diffusion term. For time advancement, the Adams-Bashforth method of the second order accuracy is applied to the convection term and the diffusion term, and the Euler implicit method of the first order accuracy is applied to the pressure gradient term. SOLA-HSMAC method (refer to Non-Patent Literature 13) that is proposed by Hirt et al is employed for coupling of the pressure and the velocity as an analysis algorism. In this case, repeated calculation is performed by using the SOR method with the easing coefficient being 1.65. The convergence is determined by a residual of 0.0002 in the continuity equation (2). Further, in order to prevent pressure vibration, defined points on the grid of three-directional velocities u, v, w, and a pressure p are positioned at a staggered grid that is displaced by the half mesh.

2.3 Treating of Solid-Fluid Boundary in V-CAD Data.

Figure 4A:
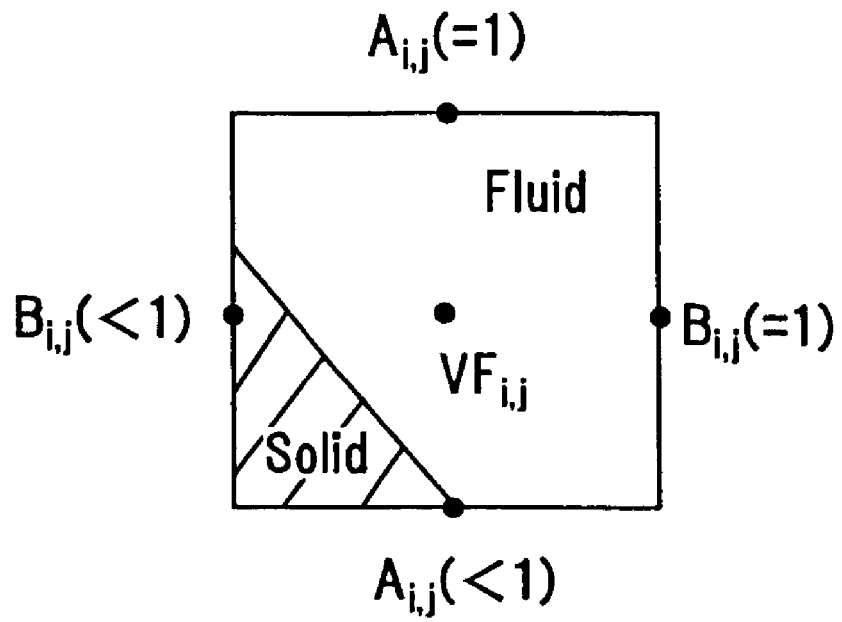
FIGS. 4A and 4B are illustrations showing the definition of two-dimensional areas fractions.
Figure 4B:
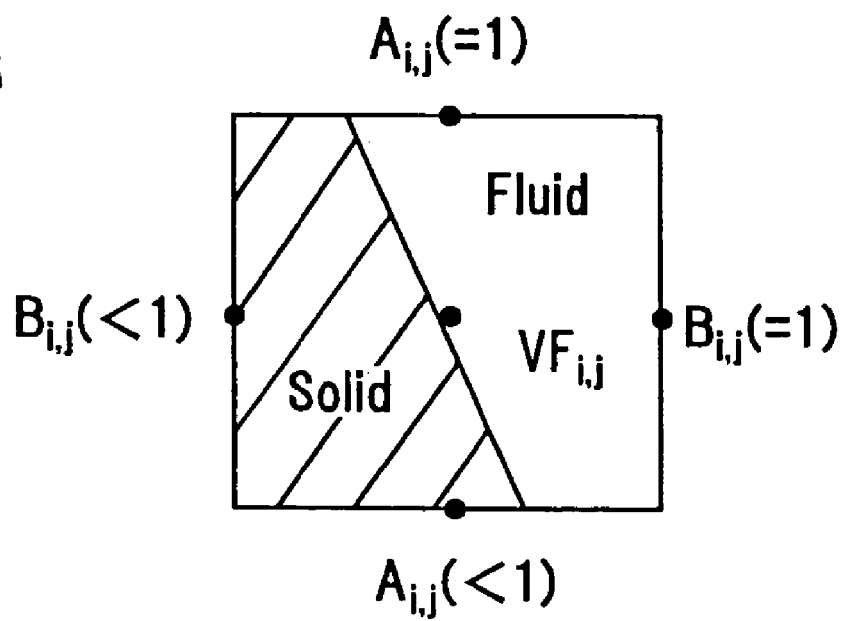

The most important algorism in the Volume-CAD system is the KTC algorism proposed by Kase and Teshima (refer to Non-Patent Literature 14), and restores the surface shape of the object from cut points of the cell. It should be noted that this KTC algorism has the same concept as that of the orthogonal grid cut cell method in the field of the fluid analysis. In the case of the KTC, even in the two-dimensional case, two or more intersection points (cut points) are present on 4 ridges of one cell. However, for simplicity, in the two-dimensional case, the number of cut points present on the ridges of one cell is limited to 2. In this case, the KTC has only 2 classifications as shown in FIGS. 4A and 4B.

The areas fractions in the cut cell method are defined by the equation (3) of Formula 5, using the information of the intersection between the fluid-solid boundary and the cell ridge.

In Formula 5, "$\Delta x_{i,j}$" and "$\Delta y_{i,j}$" designate the grid width in the X direction and the grid width in the Y direction, respectively, $A_{i,j}$ and $B_{i,j}$ designate the areas fractions in the X direction and the areas fractions in the Y direction, respectively, and $Vx_{i,j}$ and $Vy_{i,j}$ designate a line segment on the cell ridge occupied by the solid.

By obtaining the areas fractions in the respective direction, it is possible to obtain a volume void rate in the VOF method, using the equations (4) and (5) of Formula 5.

[Formula 5]

$$A_{i,j} = \frac{\Delta x_{i,j} - Vx_{i,j}}{\Delta x_{i,j}} \quad B_{i,j} = \frac{\Delta y_{i,j} - Vy_{i,j}}{\Delta y_{i,j}} \quad 0 \leq A_{i,j}, B_{i,j} \leq 1 \tag{3}$$

$$VF_{i,j} = 1 - 0.5(2 - A_{i,j} - A_{i,j-1})(2 - B_{i,j} - B_{i-1,j}) \tag{4}$$
when
$(A_{i,j} + A_{i,j-1} > 1)$ and $(B_{i,j} + B_{i-1,j} > 1)$ $$VF_{i,j} = 0.5(A_{i,j} + A_{i,j-1})(B_{i,j} + B_{i-1,j}) \tag{5}$$
when
$(A_{i,j} + A_{i,j-1} \leq 1)$ or $(B_{i,j} + B_{i-1,j} \leq 1)$

2.4 Discretization by the VOF Finite Volume Method

When conservative governing equation is discretized in the finite volume method, to apply the integral form of the equation (2) to the Green's theorem, the equation (1) in a differential form is rewritten into the diverging form of a tensor as shown in the equation (6) of Formula 6.

In Formula 6, the mark of the combination of ○ and X designates a tensor product, and the vector I designates a unit tensor corresponding to Kronecker $\delta_i$.

The discretization at fluid-solid boundary is an important part of the present invention. For a grid other than a boundary cell, discretization in an orthogonal grid by the finite volume method does not cause a large problem even in a conventional technique. For this reason, the description of this discretization will be omitted. For the fluid-solid boundary, assuming the KTC cell as shown in FIG. 4, space discretization is performed on the equation (6). The gradient of the velocity against time in a control volume is regarded as an average by using volume void rate so that time discretization can be performed on the equation (6) in a conventional manner. For this reason, the description of the time discretization in the boundary cell will be omitted.

Assuming the fluid part of the two-dimensional boundary cell to be a control volume (CV) $V_{i,j}$, space integral is performed on the equation (6) (for simplicity, an external force term vector is "f=0"). The governing equation in the finite volume method is expressed by the equation (7) of Formula 6.

[Formula 6]

$$\frac{\partial \vec{u}}{\partial t} = div(\vec{u} \otimes \vec{u}) - div(p\vec{I}) + \frac{1}{Re} div(grad(\vec{u})) + \vec{f} \tag{6}$$

$$\int_{V_{i,j}} \int \frac{\partial \vec{u}}{\partial t} dV = -\int_{V_{i,j}} \int div(\vec{u} \otimes \vec{u}) dV - \int_{V_{i,j}} \int div(p\vec{I}) dV + \frac{1}{Re} \int_{V_{i,j}} \int div(grad(\vec{u})) dV \tag{7}$$

The convection term, the pressure gradient term and the diffusion term in the equation (7) are applied to the Green's theorem (divergence theorem) so that the surface integral (for three dimension, volume integral) in the control volume is transformed into a line integral of a closed line (for three dimension, surface integral of a closed plane). In other words, a line integral is performed along the five ridges (1→2→3→4→5→1) in the control volume shown in FIG. 5. For the Cartesian coordinate of the present invention, the convection term, the pressure gradient term and the diffusion term are discretized as shown in Formula 7, respectively.

[Formula 7] (8)

convection term:

$$\int_{V_{i,j}} \int div(\vec{u} \otimes \vec{u}) dV = \oiint_{S_{1-5}} (\vec{u} \otimes \vec{u}) \cdot \vec{n} dS =$$

$$\sum_{m=1-5} (\vec{u} \otimes \vec{u})_m \cdot \vec{n} \delta S_m = [\Delta y(B_{i,j} u_{i,j}^{(x)} u_{i,j} - B_{i-1,j} u_{i-1,j}^{(x)} u_{i-1,j}) +$$

$$\Delta x (A_{i,j} u_{i-1/2,j+1/2}^{(y)} v_{i,j} - A_{i,j-1} u_{i-1/2,j-1/2}^{(y)} v_{i,j-1})]$$

$$\vec{i} + [\Delta y(B_{i,j} v_{i+1/2,j-1/2}^{(x)} u_{i,j} - B_{i-1,j} v_{i-1/2,j-1/2}^{(x)} u_{i-1,j}) +$$

$$\Delta x (A_{i,j} v_{i,j}^{(y)} v_{i,j} - A_{i,j-1} v_{i,j-1}^{(y)} v_{i,j-1})]\vec{j} \mid \text{only no-slip on wall}$$

pressure gradient term:

$$\int_{V_{i,j}} \int div(p\vec{I}) dV = \oiint_{S_{1-5}} (p\vec{I}) \cdot \vec{n} dS \tag{9}$$

$$= \sum_{m=1-5} p_m \vec{I} \cdot \vec{n} \delta S_m$$

$$= \Delta y[B_{i,j} p_{i+1/2,j} - B_{i-1,j} p_{i-1/2,j} -$$

$$p_p(B_{i,j} - B_{i-1,j})]\vec{i} + \Delta x[A_{i,j} p_{i,j+1/2} -$$

$$A_{i,j-1} p_{i,j-1/2} - p_p(A_{i,j} - A_{i,j-1})]\vec{j}$$

diffusion term:

$$\int_{V_{i,j}} \int div(grad(\vec{u})) dV = \tag{10}$$

$$\oiint_{S_{1-5}} grad(\vec{u}) \cdot \vec{n} dS = \sum_{m=1-5} grad(\vec{u})_m \cdot \vec{n} \delta S_m =$$

$$[\Delta y(B_{i,j} grad(u)_{i+1/2,j}^x - B_{i-1,j} grad(u)_{i-1/2,j}^x -$$

-continued $$(B_{i,j} - B_{i-1,j})grad(u)_p^x) + \Delta x(A_{i,j}grad(u)_{i,j+1/2}^y -$$

$$A_{i,j-1}grad(u)_{i,j-1/2}^y - (A_{i,j} - A_{i,j-1})grad(u)_p^y)]$$

$$\vec{i} + [\Delta y(B_{i,j}grad(v)_{i+1/2,j}^x - B_{i-1,j}grad(v)_{i-1/2,j}^x -$$

$$(B_{i,j} - B_{i-1,j})grad(v)_p^x) + \Delta x(A_{i,j}grad(v)_{i,j+1/2}^y -$$

$$A_{i,j-1}grad(v)_{i,j-1/2}^y - (A_{i,j} - A_{i,j-1})grad(v)_p^y)]\vec{j}$$

It should be noted that the subscript of the velocity parameter varies depending on the staggered grid stencil. The vector i and j shows the equations in the X and Y directions. The two-dimensional QUICK interpolation is applied to the velocities with the superscript (x) and (y) in the X and Y directions. The velocity gradients with the superscript x and y in the discretized equation (10) in Formula 7 designate the velocity gradients in X and Y directions, respectively, and the second order difference is applied to the respective velocity gradients with the superscript x and y.

The discretization by the cut cell has two key points.

Figure 5:
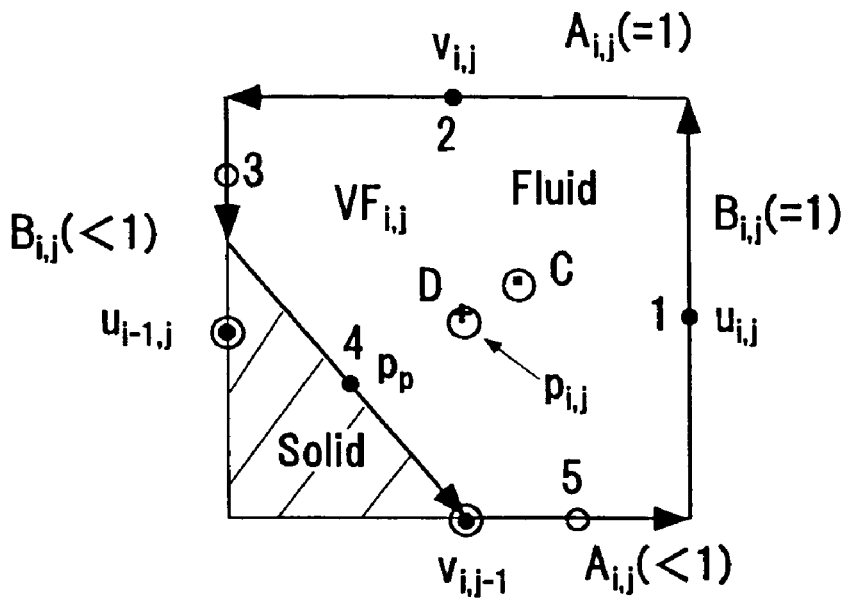
FIG. 5 is an illustration showing space discretization by a finite volume method at a boundary cell.

One of the two key points is the manipulation of the integral in the solid boundary (cut line 4 in FIG. 5). In the finite volume method, the boundary condition for the diffusion term of the second partial differentiation becomes the Neumann problem. In the case of no slip boundary condition in the solid boundary, the convection term is 0 at the cut line 4 in FIG. 5, so that the integral of the convection term is not necessary at the cut line 4, but the integrals of the pressure gradient term and the diffusion term are necessary at the cut line 4. In other words, the integral of the last term in each equation (9) and (10) is performed by using the middle point on the cut line 4 as the average value. It should be noted that for space integral, it is necessary to apply the areas fractions to the all terms.

The other of the two key points is a defined point of a parameter calculated in the cut cell. In the finite volume method, the volume average is obtained in the fluid void rate VOF, so that it is natural to position the defined point of the parameter at the center of the control volume of the fluid. However, if the defined point of the parameter is positioned at the center C indicated by the mark "○" having "•" therein of the control volume of the fluid, a complete automatization merit for the orthogonal uniform-space grid cannot be obtained. Therefore, according to the present invention, the threshold value of the VOF is set to be 0.01. In this setting, a boundary cell of which VOF is smaller than the threshold value is determined to be a complete solid, and for a boundary cell of which VOF is larger than the threshold value, the calculated parameter is not set at the control volume center, but set at the cell center (for example, the point D indicated by the mark "○" having "+" therein). Similarly, the parameter defined points of the ridge lines 3 and 5 in FIG. 5 are not set at the line segment center indicated by the mark "○", but set at the cell ridge line center indicated by the mark "◉". Further, since a parameter is not defined at the center point P of the line segment 4, the parameter at the center point P is determined by the linear interpolation. In this manner, while the reproducibility of the solid boundary is deteriorated, it is possible to maintain complete automatization of the orthogonal grid generation. Furthermore, in the fluid calculation, the conservation law can strictly be satisfied, and the above-described process is not likely to largely affect the calculation accuracy of the flow field.

2.5 Drag Force and Lift Force Acting on the Object.

At the time of analysis on the flow around the object, the calculation of the drag force and the lift force acting on the object becomes easy if the integral is performed along the first grid point of the object in the case of a boundary adaptive grid of the general coordinate system. Accordingly, in the present invention, the drag force and the lift force are calculated in the following manner.

Closed integral is performed for fluid stress tensor acting on the surface of the object, and Green's theorem is applied so that the force acting on the object can be obtained as shown in the equation (11) in Formula 8, in the case of the two dimension.

"$\sigma_n$" designates the stress tensor acting on the plane facing in the normal direction, and "$\sigma$" designates the stress tensor at the surface of the object. It should be noted that the divergence of the second stress tensor in the two dimension is constituted by four directions. Accordingly, assuming the X direction as the flow direction, and the Y direction as the direction vertical to the flow, by the re-application of the Green"s theorem, the drag force (in the flow direction) and the lift force (in the direction vertical to the flow) acting on the object can be calculated as shown in the equations (12) and (13) in Formula 8.

Once the drag force and the lift force are obtained, the drag force coefficient $C_D$ and the lift force coefficient $C_L$ can be made non-dimensional by using the main stream velocity U, the fluid density ρ, and the standard area A (in the case of the two dimension, the standard line) of the object, as shown in the equation (14) in Formula 8.

The non-dimensional Strouhal number St is calculated by the using the frequency $f_L$ of the $C_L$ as shown in the equation (15) in Formula 8.

[Formula 8] (11)

$$F = \oiint_S \sigma_n ds$$

$$= \int\int_V div\sigma dV$$

$$= \int\int_V \frac{\partial \sigma_{ij}}{\partial x_{ij}} dV$$

$$= \int\int_V \left(\frac{\partial \sigma_{xj}}{\partial x_j} + \frac{\partial \sigma_{yj}}{\partial y_j}\right) dV$$

$$= \int\int_V \left(\frac{\partial \sigma_{xx}}{\partial x} + \frac{\partial \sigma_{xy}}{\partial y}\right) dxdy + \left(\frac{\partial \sigma_{yx}}{\partial x} + \frac{\partial \sigma_{yy}}{\partial y}\right) dxdy$$

$$= F_x \vec{i} + F_y \vec{j}$$

drag force:

$$F_x = F_D \quad (12)$$

$$= \int\int_V \left(\frac{\partial \sigma_{xx}}{\partial x} + \frac{\partial \sigma_{xy}}{\partial y}\right) dxdy$$

$$= \int\int_V \left(\frac{\partial \sigma_{xx}}{\partial x}\right) dxdy + \int\int_V \left(\frac{\partial \sigma_{xy}}{\partial y}\right) dydx$$

$$= \oint_S \sigma_{xx} ds + \oint_S \sigma_{xy} ds$$

$$= \int_{y_1}^{y_2} (\sigma_{xx}|_{f_1(y)} - \sigma_{xx}|_{f_2(y)}) dy +$$

-continued $$\int_{x_1}^{x_2} (\sigma_{xy}|_{g_1(x)} - \sigma_{xy}|_{g_2(x)})dx \bigg|_{\text{only Cartesian}}$$

lift force:

$$\begin{aligned} F_y &= F_L \\ &= \iint_V \left(\frac{\partial \sigma_{yx}}{\partial x} + \frac{\partial \sigma_{yy}}{\partial y}\right)dxdy \\ &= \iint_V \left(\frac{\partial \sigma_{yx}}{\partial x}\right)dxdy + \iint_V \left(\frac{\partial \sigma_{yy}}{\partial y}\right)dydx \\ &= \oint_S \sigma_{yx}ds + \oint_S \sigma_{yy}ds \\ &= \int_{y_1}^{y_2} (\sigma_{yx}|_{f_1(y)} - \sigma_{yx}|_{f_2(y)})dy + \\ &\quad \int_{x_1}^{x_2} (\sigma_{yy}|_{g_1(x)} - \sigma_{yy}|_{g_2(x)})dx \bigg|_{\text{only Cartesian}} \end{aligned} \quad (13)$$

$$\sigma_{xx} = -p + 2\mu \frac{\partial u}{\partial x} \quad (14)$$

$$\sigma_{xy} = \sigma_{yx} = \mu\left(\frac{\partial u}{\partial y} + \frac{\partial v}{\partial x}\right)$$

$$\sigma_{yy} = -p + 2\mu \frac{\partial v}{\partial y}$$

$$C_D = \frac{F_D}{\rho U^2 D/2} \quad C_L = \frac{F_L}{\rho U^2 D/2} \quad (15)$$

$$St = f_L D/U \quad (16)$$

3. Calculation Result and Consideration

For testing an analysis scheme and a numerical value model in the numerical analysis on fluid, generally, the benchmark test target for an internal flow is a channel flow, and the benchmark test target for an external flow is a flow around a circular cylinder. Also in the present invention, for testing the cut cell finite volume method combined with the VOF method, the numerical analysis was performed on the two-dimensional Poiseuille flow and the flow around the stationary circular cylinder, and the result of this numerical analysis is compared to the data obtained by other researchers. There is the analytical theorem solution for the two-dimensional Poiseuille flow, and there are much experimental data and calculation data for the flow around the stationary circular cylinder. For the application to the practical use, the analysis was performed on a flow over a backward-facing step, a flow in a narrow pipe, a flow around an obstacle in a channel, a flow in a branch pipe, a flow around a plurality of bluff bodies, and a flow in a premixed combustion chamber. The calculation result of this analysis is described in the following with reference to the visually shown drawings.

3.1 Testing on the Channel Poiseuille Flow

Figure 6A:
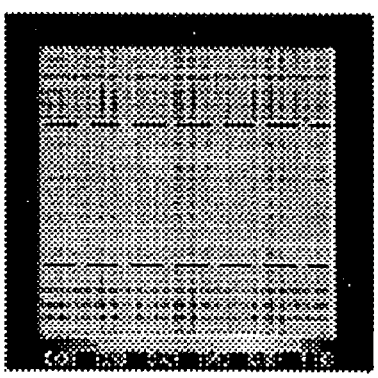
FIGS. 6A, 6B and 6C are images showing analyzed VOF distributions for three cases.
Figure 6B:
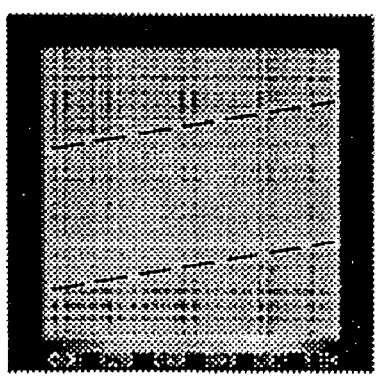
Figure 6C:
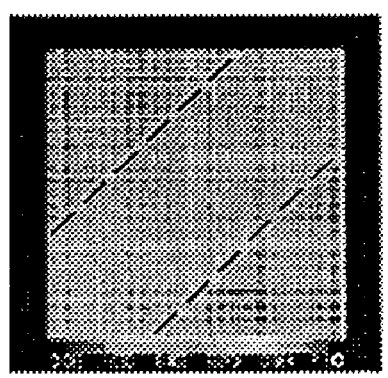

For testing the effect of the VOF of the cut cell, analysis was performed on a duct in an analysis area of a 10D×10D square with the duct being inclined by 0 degree, 10 degrees and 45 degrees. In this analysis, the number of the entire grids was 64×64, the half width of the duct was 2.5D, the Reynolds number Re defined by this half width was 1, and the time interval Δt was 0.0001, the analysis time steps are 10000. The influx condition and the efflux condition both were set as a parabolic distribution. The pressure gradient in the flow direction was set to be 1.0. In addition, the HSMA method was used while directly giving the pressure boundary condition at the entrance, the exit and the wall. The VOF distributions for three cases are shown in FIGS. 6A, 6B and 6C. The broken lines in FIGS. 6A, 6B and 6C indicate the boundaries. The velocity distributions in the flow direction respectively corresponding to the three cases are shown FIGS. 7A, 7B and 7C, respectively with comparison to the theoretical analysis solution.

Figure 7A:
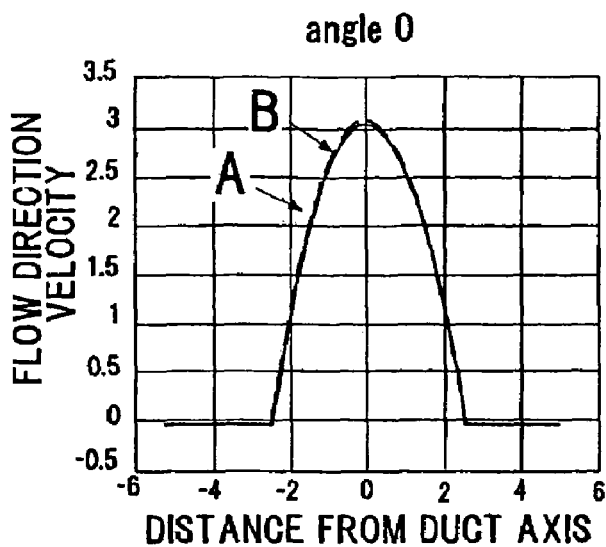
FIGS. 7A, 7B and 7C are graphs for comparison on flow direction velocity distributions and theoretical solutions in three cases.
Figure 7B:
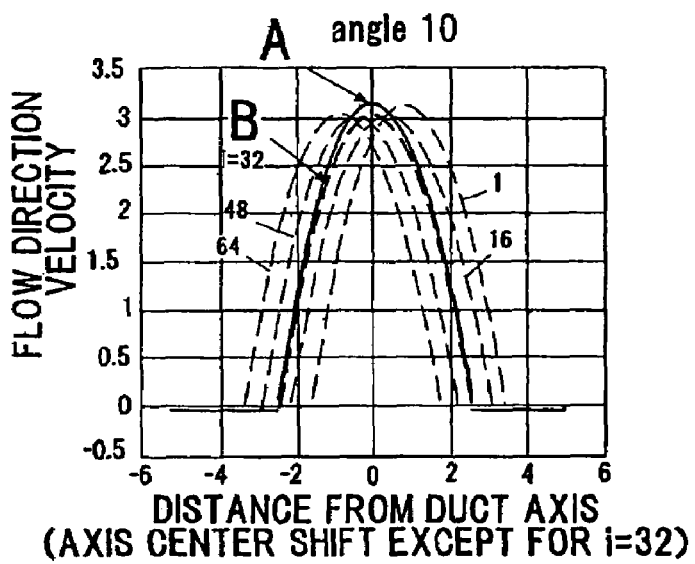
Figure 7C:
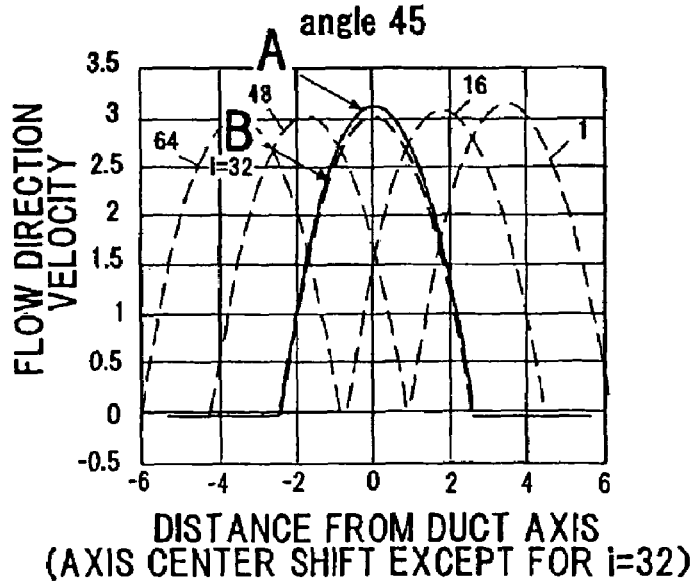

In FIGS. 7A, 7B and 7C, the analysis indicated by the carved line A is theoretical analysis solution, and the "i=32" of the line curved line B is velocity distribution in the section vertical to the flow at the flow axis center positioned at the 32th grid point. The velocity distribution calculated for the duct that was not inclined (inclination angle: 0 degree) is well consistent with the theoretical analysis solution. Meanwhile, for the velocity distributions calculated for the ducts which are inclined by 10 degrees and 45 degrees, although the maximum velocity at the axis center is slightly underestimated, it can be said that the analysis result is consistent with the theoretical analysis solution.

3.2 Testing for the Flow Around the Stationary Circular Cylinder.

The analysis on the flow around the circular cylinder that is the testing target for the analysis scheme, the model would be the most difficult matter for the orthogonal grid. According to the present invention, the analysis on the stationary circular cylinder put in an uniform flow was performed for 24 cases in which the Reynolds number defined by the diameter of the cylindrical changes from 1 to 20000, with the analysis area being 10D×10D, and the grid number being 64D×64D. The non-dimensional time in the calculation was set to be 100, and the coordinate of the circle center of the circular cylinder was set to be "X=2.5D, Y=5.0D" as shown in FIG. 6. For the velocity condition, the slip on the surface of the circular cylinder did not occur, the influx condition at the influx side was a uniform flow (velocity in the flow direction is 1.0), the efflux condition at the efflux side was a free efflux in the X direction (velocity gradient is 0), and the free slip was set in the Y direction. Furthermore, since the velocity and the pressure are simultaneously adjusted by the HSMAC method, it is not necessary to directly give the pressure boundary condition for the influx, the efflux and the wall.

Figure 8:
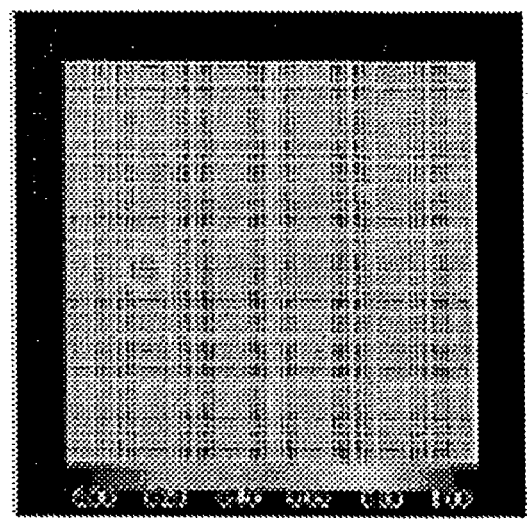
FIG. 8 is an image showing an analysis grid and a VOF distribution.
Figure 9:
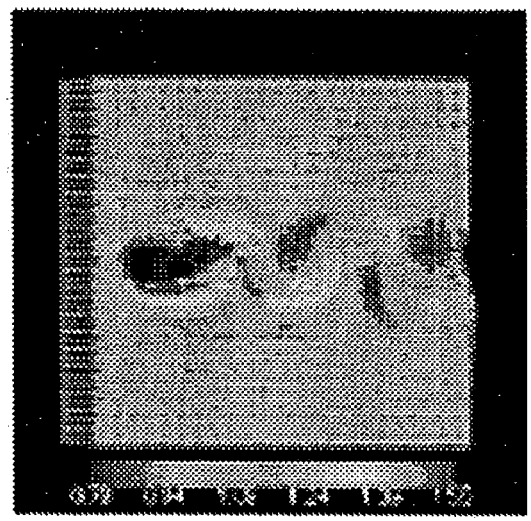
FIG. 9 is an image showing a velocity vector.
Figure 10:
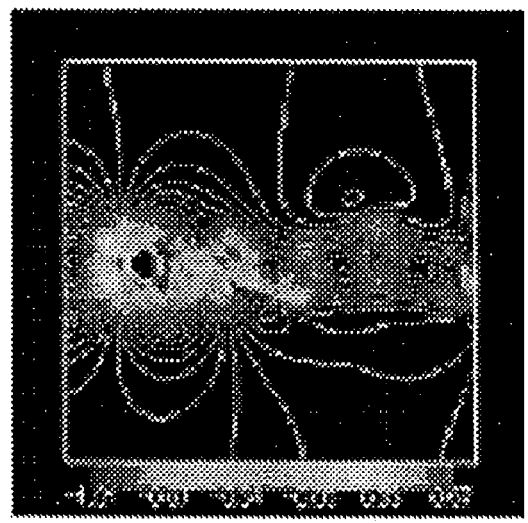
FIG. 10 is an image showing a constant pressure line.

FIG. 8 shows the VOF distribution for the grid and the entire analysis area. FIGS. 9 and 10 show the velocity vector and the constant pressure line when the Reynolds number Re is 300. In FIGS. 9 and 10, the periodic Karman vortex street, the unsteady flow pattern, is observed behind the circular cylinder. This Karman vortex street is common when the Reynolds number Re is larger than 80, so that the calculation result for this in the case of the other Reynolds number is omitted.

Figure 11:
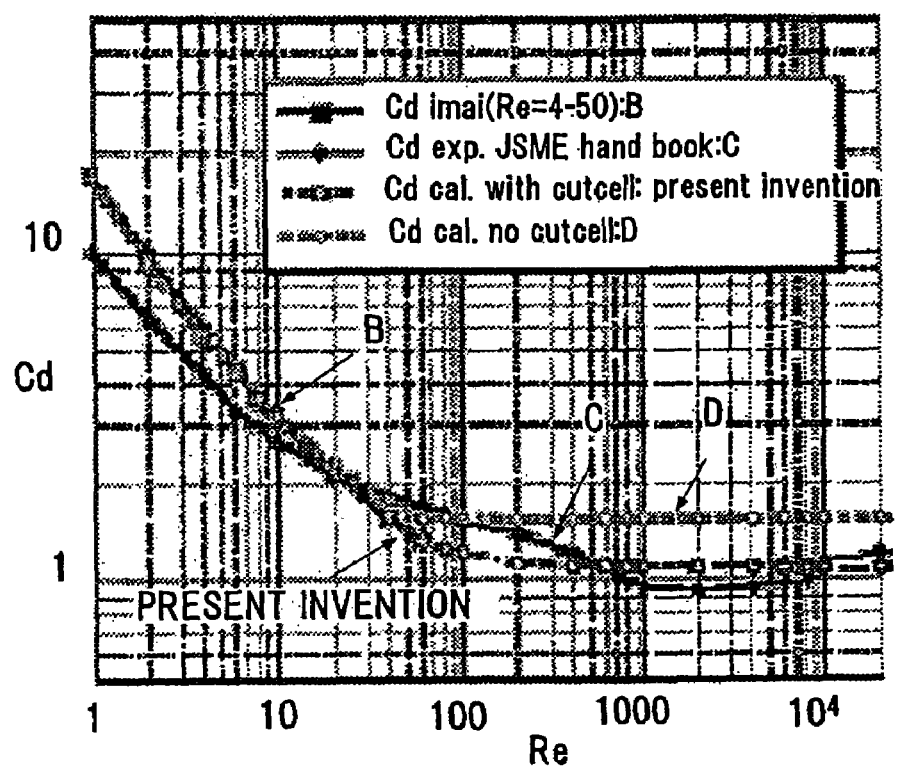
FIG. 11 is a graph showing an average drag force coefficient according to the present invention.
Figure 12:
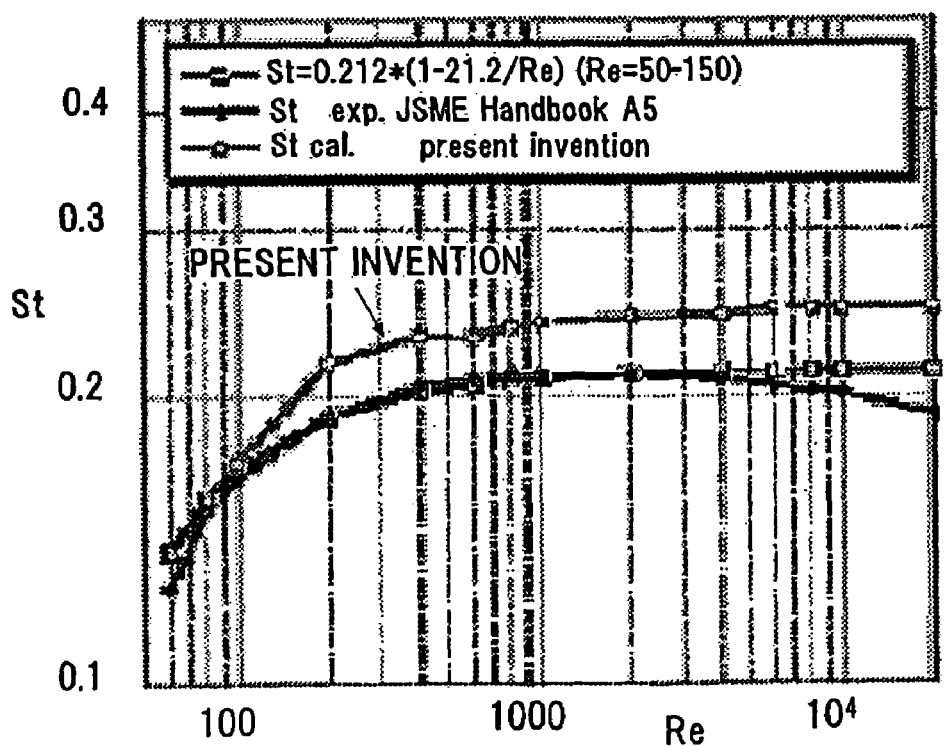
FIG. 12 is a graph showing average Strouhal number according to the present invention.

FIGS. 11 and 12 respectively show average values of the drag force coefficient and the average Strouhal number over the non-dimensional time 50 to 100, with compared to other experimental data. For the drag force, the calculation result for the Reynolds number Re smaller than 60 in the present invention is well consistent with the result (B) obtained by the equation by Imai. Around the Reynolds number Re being 100, the calculation result of the present invention is slightly smaller than the experimental data (C). For the Reynolds number being larger than 400, the calculation result of the present invention is not almost different from the experimental data (C).

The reason for this is considered to be that the resolution for the boundary layer at the wall at the circular cylinder is not sufficiently obtained when the Reynolds number Re becomes larger than the order of 100 (Re=100(O)) because the space resolution in the present invention is low (10/64=0.15). As understood from FIG. 11, for the Reynolds number Re being larger than 50, the calculation result (D) obtained by the step approximation without the cut cell is apparently overestimated to be larger than that of the experiment. On the other hand, the calculation in the cut cell VOF method proposed in the present invention greatly improves the overestimation for the Reynolds number Re being larger than 50.

For the average Strouhal number, although the calculation result of the present invention is larger than the experimental data, the calculation result of the present invention stays within the range of 2.0 to 2.5 that is considered to be appropriate values for the Reynolds number Re larger than 200.

Figure 13A:
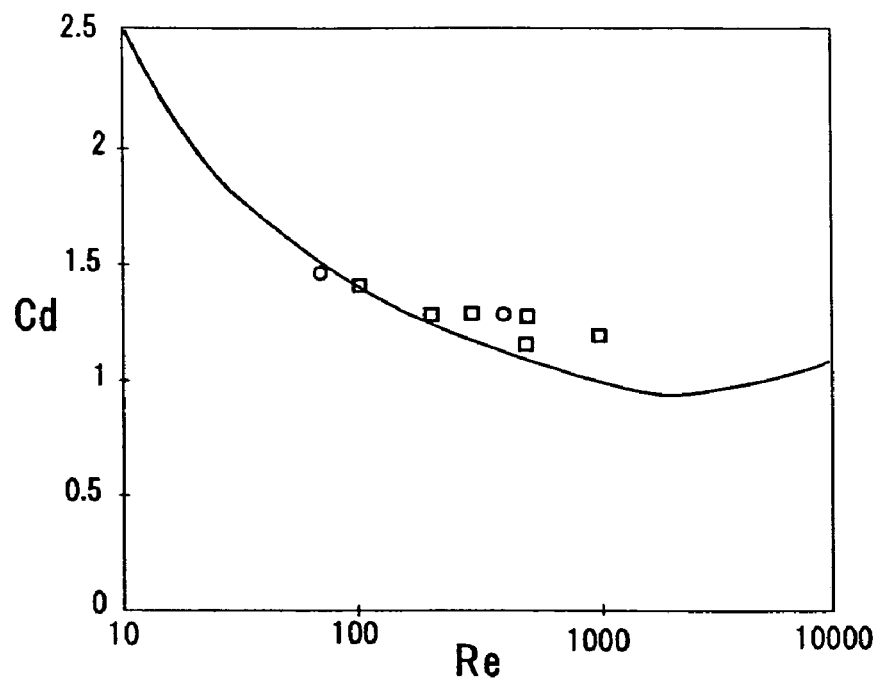
FIG. 13A is a graph showing a drag force coefficient of a stationary circular cylinder according to the Cartesian adaptive grid method.
Figure 13B:
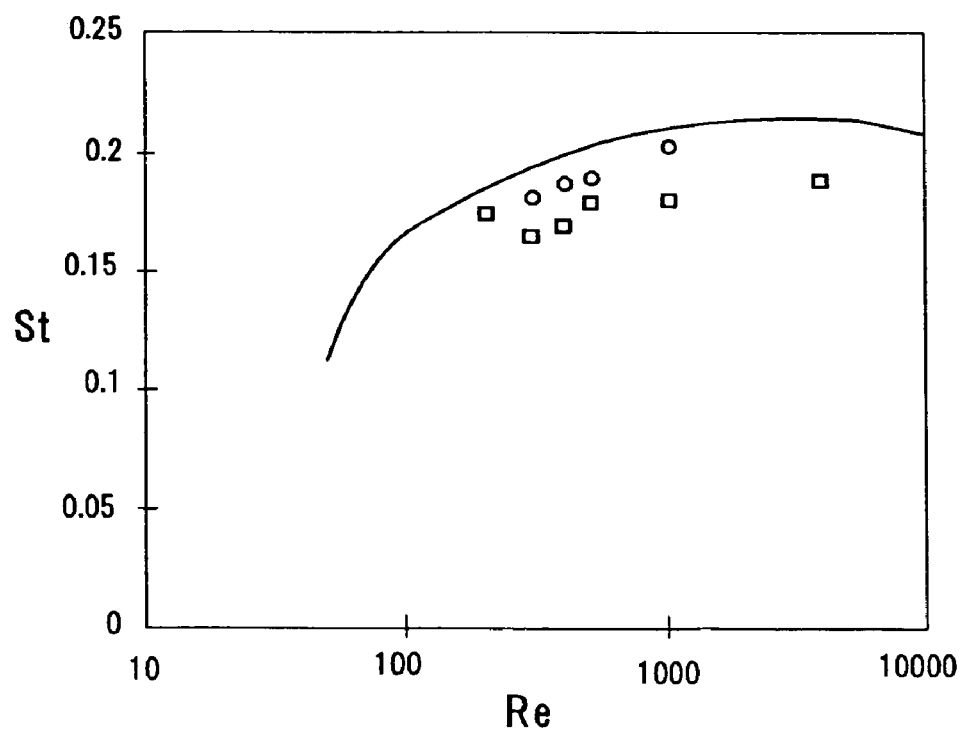
FIG. 13B is a graph showing average Strouhal number according to the Cartesian adaptive grid method.
Figure 14A:
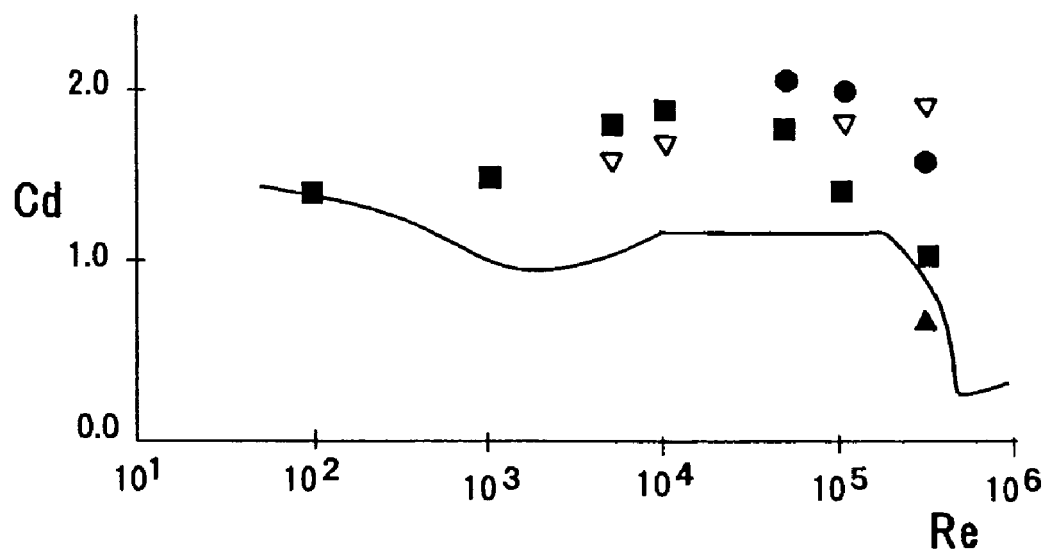
FIG. 14A is a graph showing a drag force coefficient of a stationary circular cylinder according to the general coordinate system boundary adaptive method.
Figure 14B:
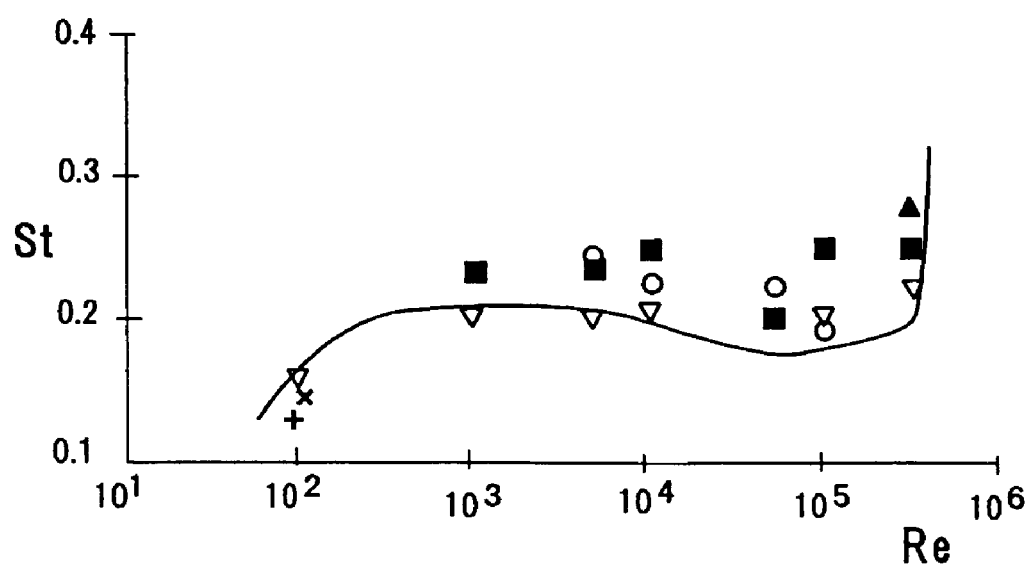
FIG. 14B is a graph showing Strouhal number according to the general coordinate system boundary adaptive method.

FIGS. 13A and 13B show the analysis results of the average values of the drag force coefficient and the average Strouhal number for the circular cylinder according to the adaptive Cartesian grid method of other researchers (refer to Non-Patent Literature 15). FIGS. 14A and 14B show the analysis results of the drag force coefficient and the Strouhal number according to the adaptive grid method for a general coordinate system (refer to Non-Patent Literature 16). The Strouhal numbers obtained in these conventional methods are partially displaced from the appropriate range of 0.2 to 0.25 for the Reynolds number Re larger than 200. Thus, the calculation for the Strouhal number according to the present invention (as shown in FIGS. 11 and 12) is more precise than these conventional boundary adaptive grid methods.

Figure 15A:
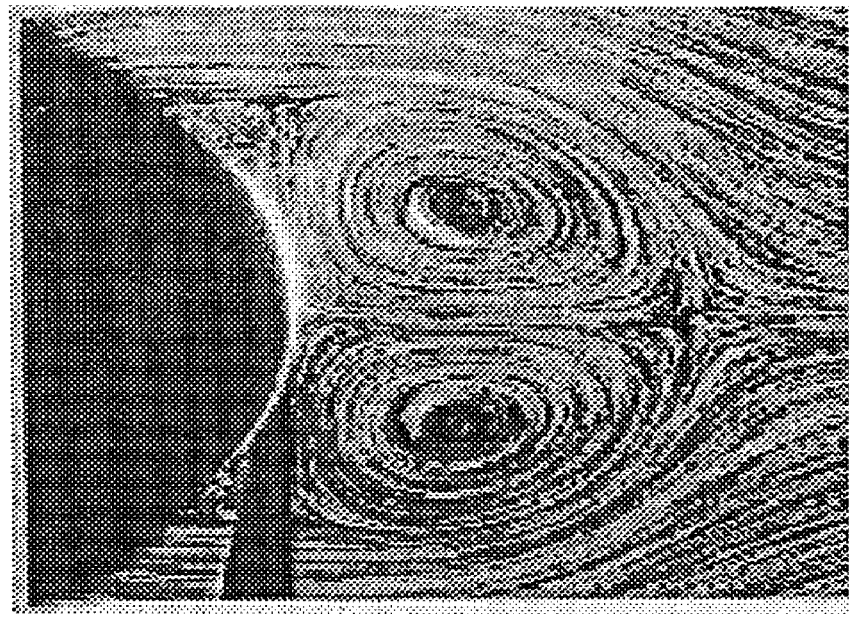
FIG. 15A is an image showing a flow in experiment at Re=300 and T=2.5.
Figure 15B:
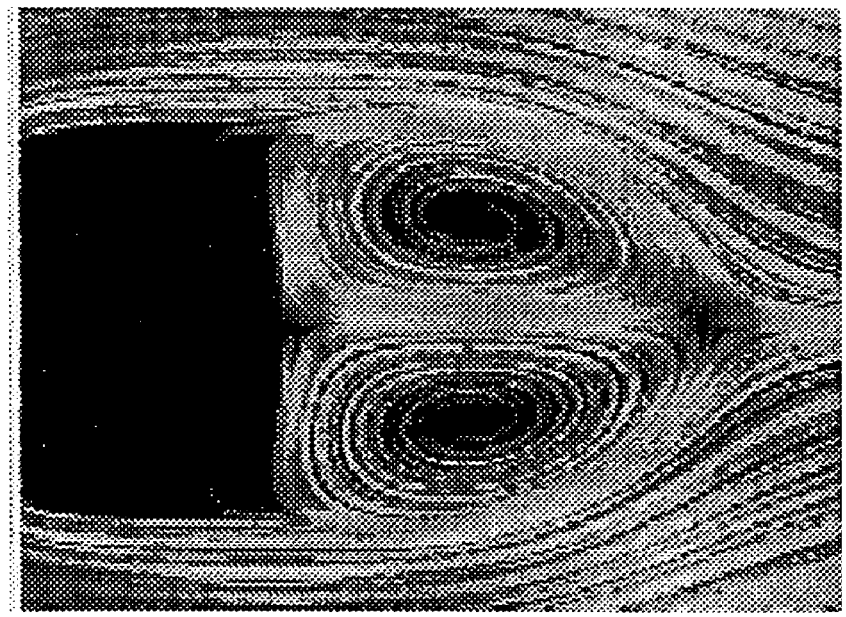
FIG. 15B is an image showing a flow according to the present invention.
Figure 16A:
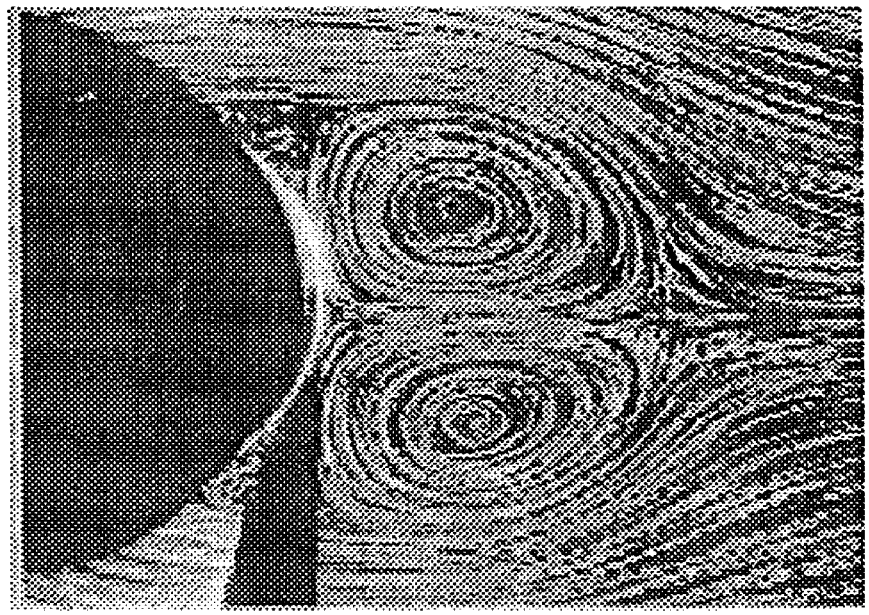
FIG. 16A is an image showing a flow in experiment at Re=550 and T=2.5.
Figure 16B:
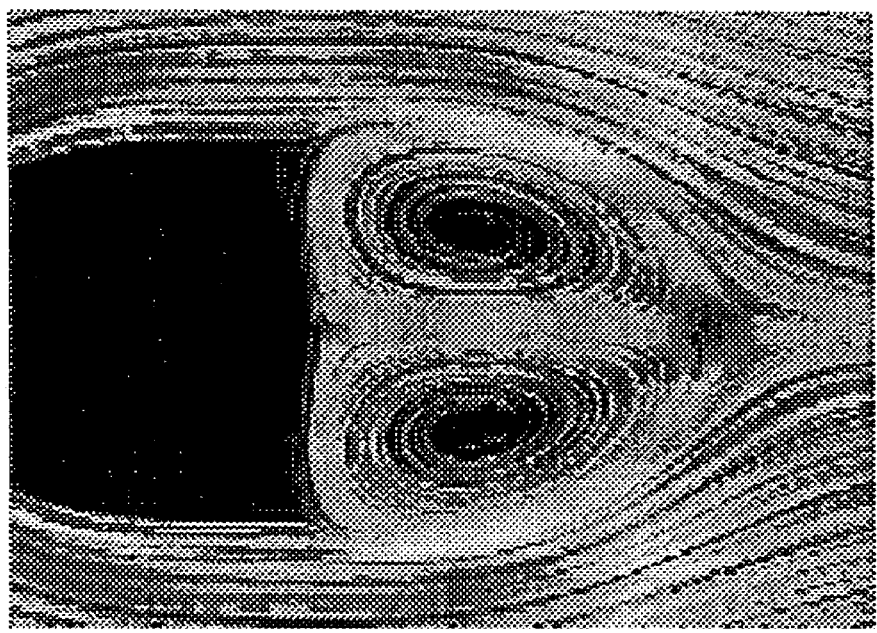
FIG. 16B is an image showing a flow according to the present invention.

FIGS. 15A and 15B are enlarged illustrations of the flow around the circular cylinder showing the results of the visualized experiment of the Non-Patent Literature 17, and the calculation result of the present invention, for the Reynolds number Re of 300, at the non-dimensional time T of 2.5. FIGS. 16A and 16B are illustrations of the flow around the circular cylinder showing the result of the experiment of Non-Patent Literature 17, and the corresponding calculation result of the present invention, for the Reynolds number Re of 550, at the non-dimensional time T of 2.5.

As understood from these drawings, in each of these case, the result of the present invention is well consistent with the visualized experiment for the shape and the size of the double vortex near the circular cylinder, and the distance from the directly back side of the circular cylinder to the position of the re-interflow of the circulated vortex.

Figure 17A:
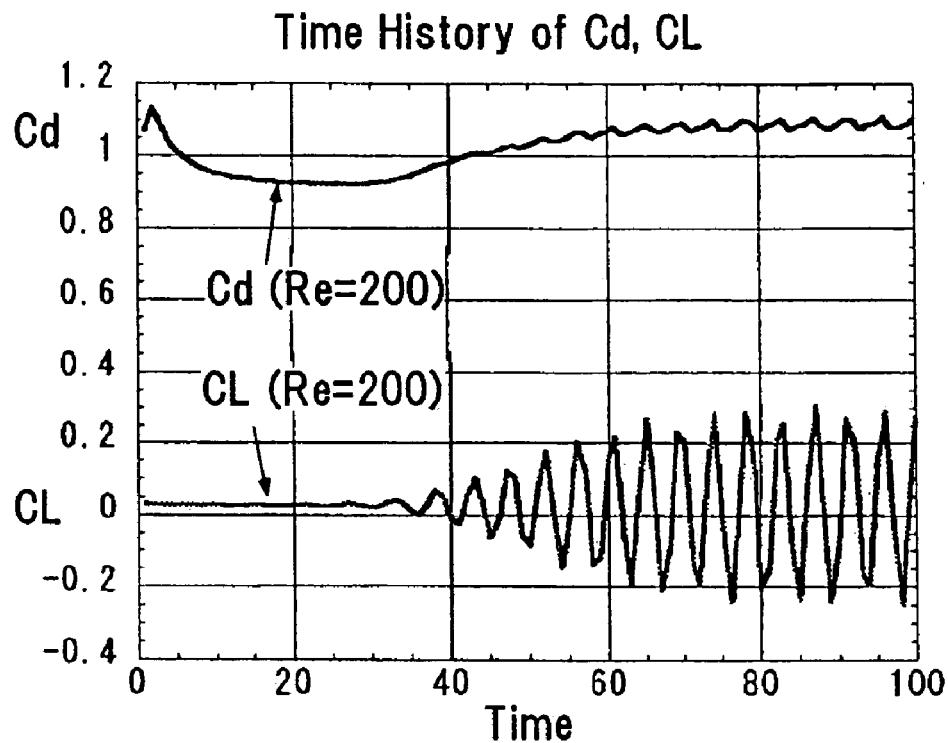
FIG. 17A is a graph showing temporal change in drag force and lift force according to the present invention.
Figure 17B:
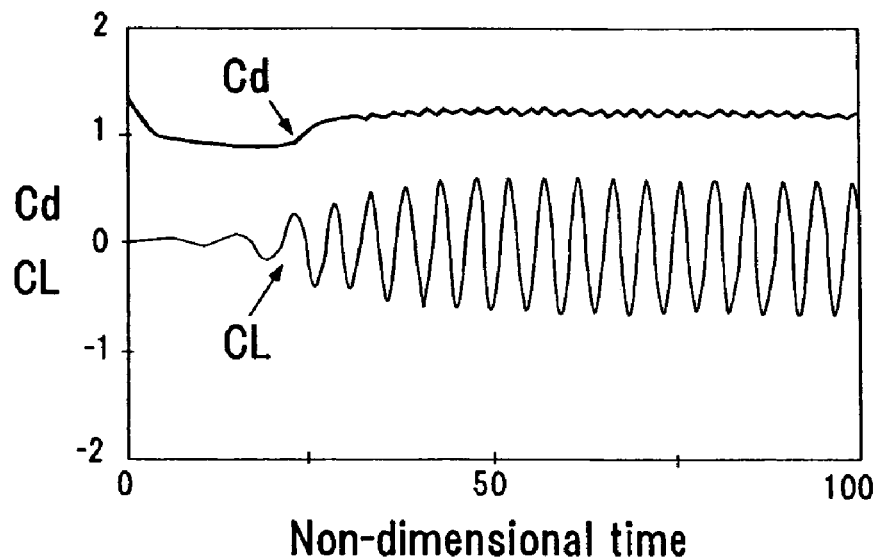
FIG. 17B is a graph showing the result according to the partial boundary adaptive Cartesian grid method.
Figure 18A:
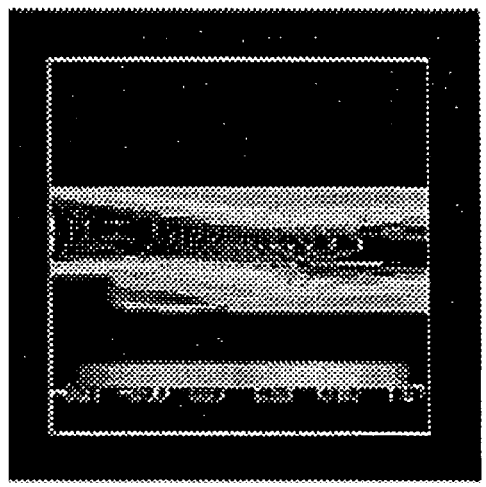
FIGS. 18A through 18F are images of application examples for practical use.
Figure 18B:
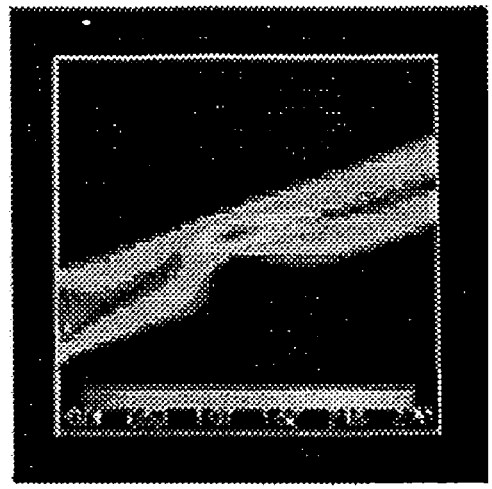
Figure 18C:
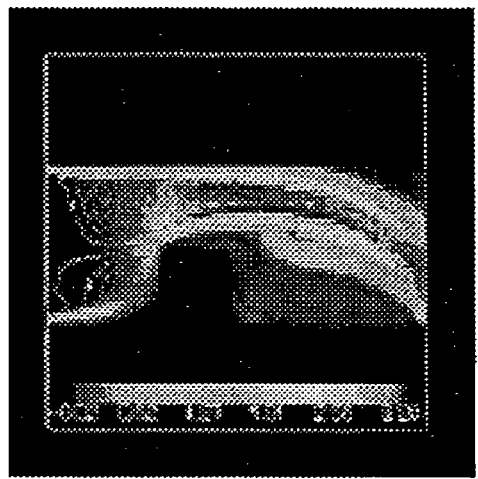
Figure 18D:
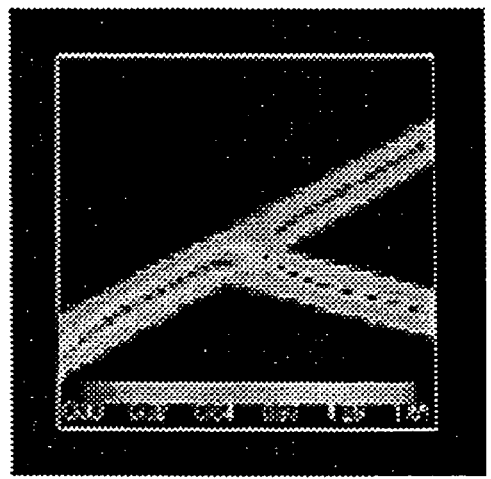
Figure 18E:
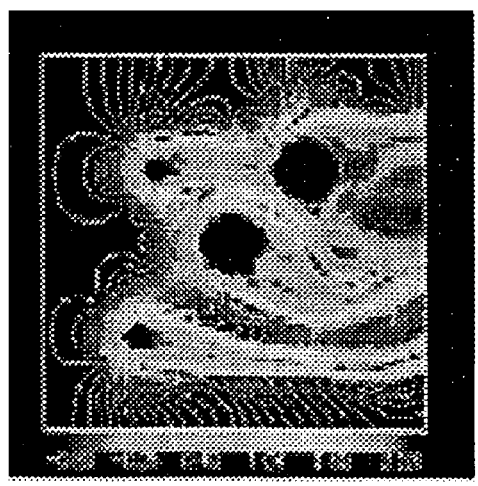
Figure 18F:
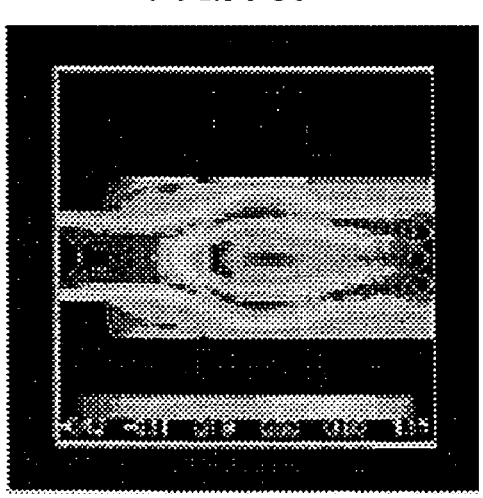
Figure 19A:
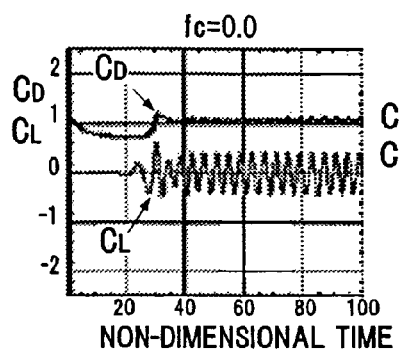
FIGS. 19A through 19I show waveforms of temporal change in a drag force coefficient $C_D$ and a lift force coefficient $D_L$ acting on a circular cylinder vibrating at each frequency and a stationary circular cylinder.
Figure 19B:
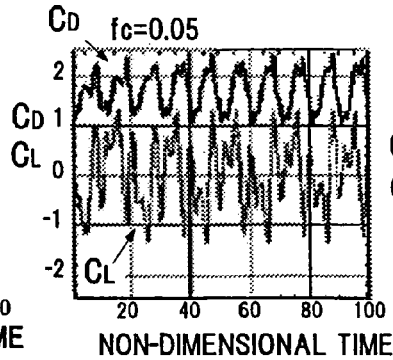
Figure 19C:
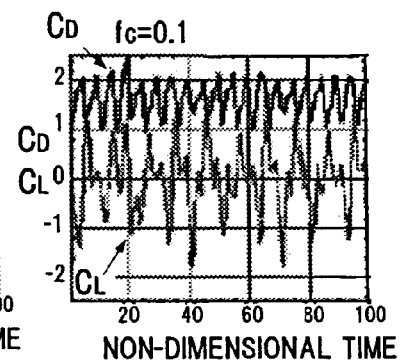
Figure 19D:
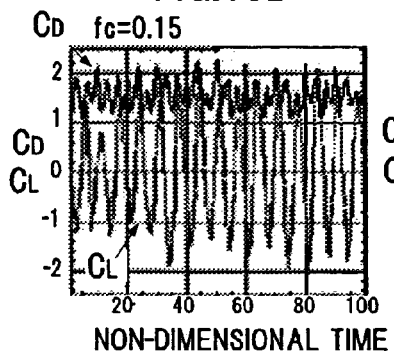
Figure 19E:
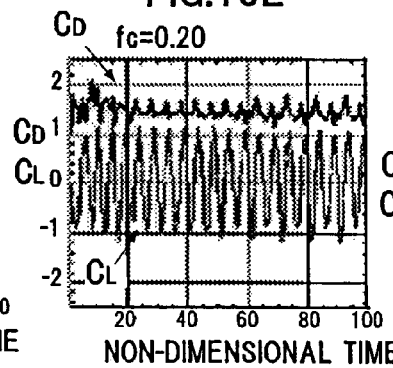
Figure 19F:
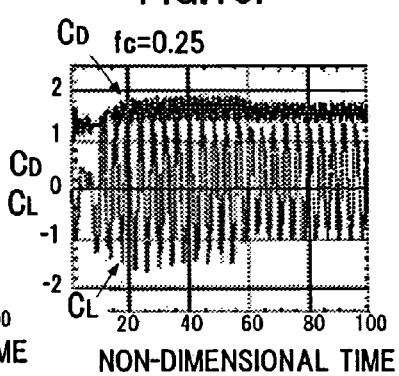
Figure 19G:
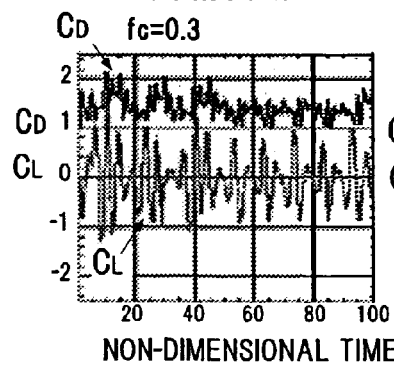
Figure 19H:
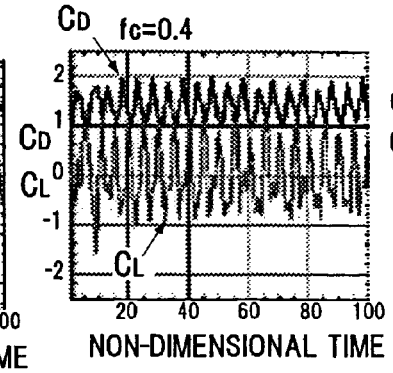
Figure 19I:
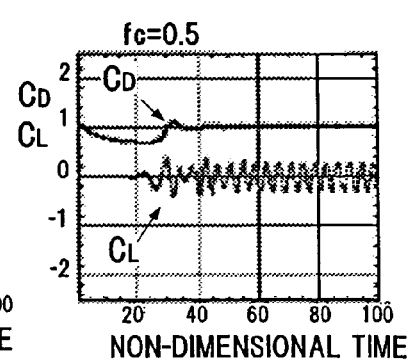
Figures 1, 21A:
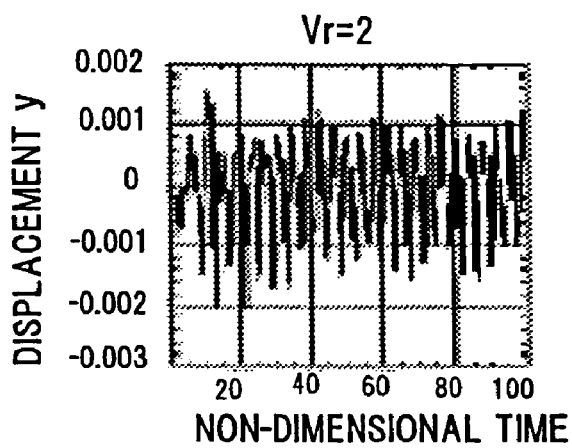
FIGS. 21A through 21C show temporal change in displacement y (left drawing), a drag force coefficient $C_D$ and a lift force coefficient $D_L$ (right drawing), at a range of the non-dimensional fluid velocity of Vr=2, 3 and 4
Figures 2, 21A:
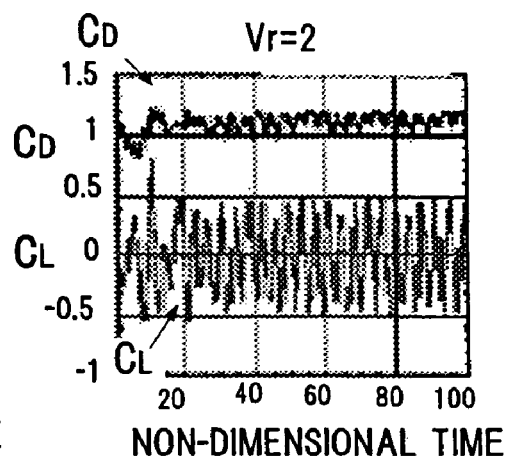
Figures 1, 21B:
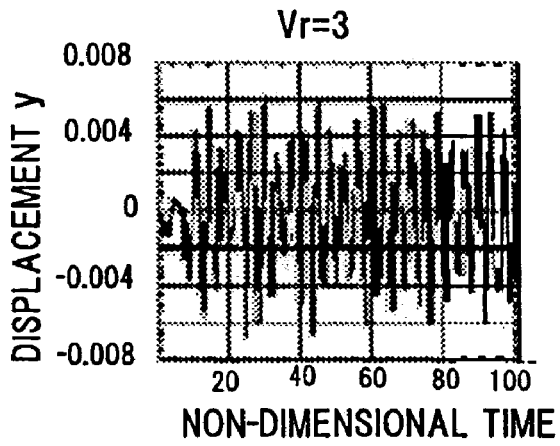
Figures 2, 21B:
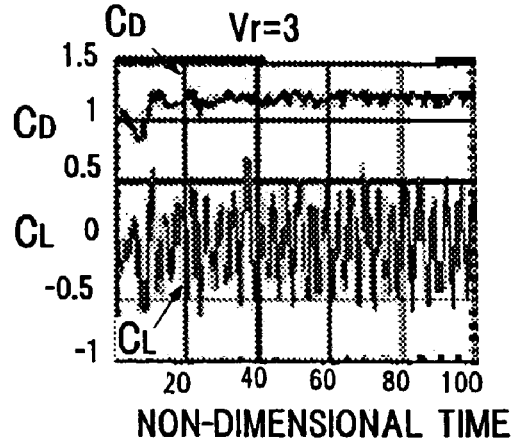
Figures 1, 21C:
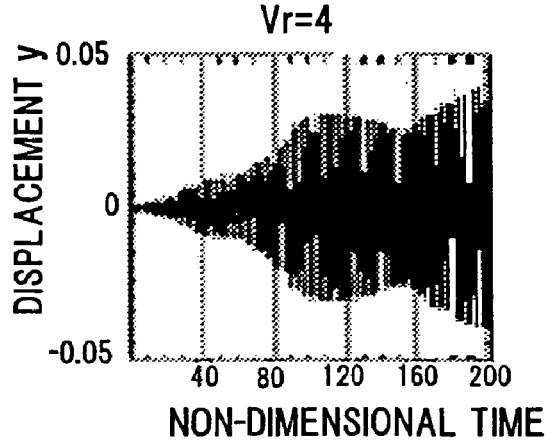
Figures 2, 21C:
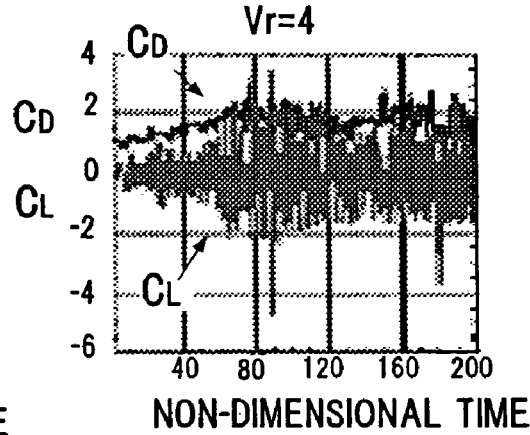

FIGS. 17A and 17B show temporal change in the drag force and the lift force of the circular cylinder according to the method of the present invention, and temporal change in the drag force and the lift force of the circular cylinder according to the c of Non-Patent Literature 6 by PIAO et al. It was confirmed that the drag force and the Strouhal number obtained by the uniform interval Cartesian grid method of the present invention is well consistent with the result obtained by the partial boundary adaptive Cartesian grid method. The amplitude of the lift force obtained by the present invention is estimated to be smaller than that obtained by the partial boundary adaptive Cartesian grid method. It is considered that this is because the calculation area in the Non-Patent Literature 6 is 30D×15D, and a convection condition is used as the effluent boundary in the Non-Patent Literature 6.

The calculation was performed for 24 cases of the Reynolds number Re of 1 to 20000 (not shown in the drawing). As a result, the Karman vortex appeared at the Reynolds number equal to or larger than 80. This critical Reynolds number is somewhat larger than the critical Reynolds number Re of 50 in the experiment and the theory, but is considered to satisfy the requirement of the practical use.

3.3 The Application Example for the Practical Use

We attempted to apply the present developed analysis method to the several examples. As shown in FIGS. 18A through 18F, these examples are: (A) a flow over a backward-facing step; (B) a flow in a narrow pipe; (C) a flow around an obstacle in a channel; (D) a flow in a branched pipe; (E) a flow around a plurality of bluff bodies; and (F) a flow in a premixed combustion chamber.

In these drawings, only the u distribution for the X-direction velocities are shown. In these application examples, the calculation area was 10D×10D, and the number of the grids was 64×64, similarly to the duct flow calculation (3.1) and the flow calculation around the circular cylinder (3.2). In these application examples, the Reynolds number Re was 100, and the influx condition and the efflux condition were set to be the same as in the calculation of (3.2). In other words, it becomes possible to calculate the flow field of an arbitrary shape by only inputting the V-CAD data directly, without amending the developed calculation program.

4. Next, the analysis method of the present invention is applied to the numerical calculation (fluid-structure interaction analysis) on a flow accompanied by a moving boundary. The fluid-structure interaction analysis is important particularly from the engineering standpoint of the wind engineering and a heat exchanger.

The numerical calculation was performed on (1) forced vibration of a two-dimensional circular cylinder placed in a uniform flow, and (2) a vortex self-excited vibration for a circular cylinder, as concrete examples of the fluid-structure interaction analysis. The resonance state caused by the lock-in phenomenon and the vortex self-excited vibration was tested as a representative fluid-structure interaction problem that inflicts a fatal damage to a structure. The following description is directed to an effectiveness of the analysis method in the fluid-structure interaction analysis according to the present invention.

4.1 Basic Equation

For calculation on circular cylinder vibration, an assumed model is a one-mass-point and one-degree-of-freedom system as an elastically supported rigid structure in which one mass point is vibrated in a direction vertical to a flow direction.

In the case where the circular cylinder is forcibly vibrated, the circular cylinder is forcibly vibrated in a sine curve in a direction (Y direction) vertical to a uniform flow. In other words, the Y-direction displacement of the center of the circular cylinder is given by the equation (17) of Formula 9 where "A" designates an amplitude, "fc" designates the frequency of the forcible vibration, and "t" designates time.

The velocity boundary condition in the Y direction on the surface of the circular cylinder is given by the equation (18) of Formula 9.

In the case where the circular cylinder is forcibly vibrated due to the vortex shedding, the vibration equation having a dimension is given as the one-mass-point and one-degree-of-freedom dumper/spring model by the equation (19) of Formula 9.

In the equation (19), "m" designates the mass of the circular cylinder, "c" the viscous damping coefficient, "k" the elastic recovery coefficient of the spring, "p" the fluid density, "$U_0$" the velocity of the uniform flow, "D" the diameter of the circular cylinder, and "$C_L$" the lift force coefficient. The equation (19) is made non-dimensional by using the parameter, which controls vibration response, such as the characteristic frequency $f_0=(k/m)^{0.5}/(2\pi)$, the non-dimensional damping coefficient h=c/(2(mk)0.5), the Scruton number Sc=$2\pi h(2\rho_e/\rho)$, as shown in the equation (20) of Formula 9.

[Formula 9]

$$y = A\sin(2\pi f_c t) \quad (17)$$

$$v_w = A 2\pi f_c \cos(2\pi f_c t) \quad (18)$$

$$m\frac{d^2 \tilde{y}}{dt^2} + c\frac{d\tilde{y}}{dt} + k\tilde{y} = \frac{1}{2}\rho U_o^2 D C_L \quad (19)$$

$$\frac{d^2 y}{dt^2} + (4\pi h f_o)\frac{dy}{dt} + (2\pi f_o)^2 y = \frac{8h}{Sc} C_L \quad (20)$$

4.2 Numerical Value Solution

In the case where the circular cylinder is vibrated, the moving velocity of the circular cylinder calculated by the equation (18) or (20) is given as a value varying every calculation time step for the velocity boundary condition of the flow field.

For the analysis on the vortex self-excited vibration of the circular cylinder, the initial displacement and the initial velocity of the circular cylinder are set to be 0, and the vibration equation (20) is integrated by the Newmark's β method to obtain the vibration displacement and the vibration velocity of the circular cylinder.

The fluid-structure interaction analysis is not strong coupling that couples the fluid system and the structure system in a unified manner, but weak coupling that discretizes the fluid equation and the structure equation, and explicitly uses the boundary conditions for discretized equations. Particularly in the strong coupling, in principle, a time interval in coupling analysis on a complicated fluid-structure system is restricted to the smaller of the time interval for the fluid calculation and the time interval for the structure calculation. However, according to the present invention, the simple dumper/spring model is used in the calculation for the structure, so that the time interval is determined by the CFL condition in the fluid analysis. Further, when the future acceleration is integrated by the Newmark's β method, the lift force in the equation (20) is explicitly gived by using the current value.

4.3 The Flow Around the Forcibly Vibrated Circular Cylinder.

In the case of the Reynolds number Re of 1000 in the flow field, the flow around the forcibly vibrated circular cylinder was analyzed by using the equations (17) and (18), on the same condition as that of (3.2). It is known that for the Reynolds number Re of 1000, the Strouhal number St of the non-dimensional vortex shedding frequency for the stationary circular cylinder is about 0.2 as the experimental value. For the calculation condition on the forcible vibration, the amplitude A was set to be 0.1, and the calculation was performed for 8 cases, that is, the forcible vibration frequencies fc of 0.05, 0.1, 0.15, 0.2, 0.25, 0.3, 0.4, and 0.5. FIGS. 19A through 19I show temporal varying waveform of the drag force coefficient $C_D$ and the lift force coefficient $C_L$ of the flow force acting on the circular cylinder at respective frequencies including the stationary circular cylinder.

From the temporal waveform of the drag force and the lift force in FIGS. 19A through 19I, it can be understood that the drag force and the lift force acting on the circular cylinder vibrating at the respective frequencies except for the frequency fc of 0.5 are larger than those acting on the stationary circular cylinder.

FIG. 20 shows the relation between the forcible vibration frequency fc and the Strouhal number that represents a vortex shedding state in the flow obtained by the vibration wave of the lift force. From the calculation result of fc/St=1 at the range of 0.15<fc<0.25 around the Strouhal number of 0.2, it is understood that the lock-in phenomenon at the frequency of the vortex shedding caused by the forcible vibration is well reproduced. In addition, from FIGS. 19A through 19I, it is understood that the drag force and the lift force increase in the lock-in region.

The present invention and the experiment by Okamoto et al (of the Non-Patent Literature 18) differ (the Reynolds number (Re=19000) and the vibration amplitude (A=0.05) of the circular cylinder). However, the lock-in region of 0.186<fc<0.216 obtained by the experiment by Okamoto et at is included in the lock-in region of the present invention.

4.4 The Self-Excited Vibration Due to the Vortex Shedding at the Circular Cylinder.

On the same analysis condition as that of (4.3), the vibration displacement and the vibration velocity of the vortex self-excited vibration of the circular cylinder are calculated by integrating the vibration equation (20) by the Newmark's β method. Further, the velocity boundary condition in the flow field is imposed for the vibration velocity of the circular cylinder. With the Reynolds number Re in the flow field being 10000, Scruton number Sc being 5, and the damping coefficient h being 1%, the calculation was performed for 7 cases, that is, the non-dimensional flow velocities Vr=Uo/(foD) of 2, 3, 4, 5, 6, 7 and 8. FIGS. 21A through 21C and 22D through 22G show the temporal changes in the drag force coefficient $C_D$, the lift force coefficient $C_L$ and the displacement y for the respective the non-dimensional flow velocities.

For the vortex self-excited vibration analysis on the circular cylinder shown in FIGS. 21A through 21C and 22D through 22G, the assumed model is one-mass-point and one-degree-of-freedom system of the elastically supported rigid structure that is vibrated in the direction vertical to the flow. However, from the calculation result shown in FIGS. 21A through 21C and 22D through 22G, the lift force $C_L$ term at the right-hand side of the equation (20) irregularly varies due to the unsteady vortex shedding. Furthermore, for the fluid-structure interaction movement, the vibrating circular cylinder gives unsteady disturbance to the flow field. Similarly to the sine forcible vibration of (4.3), the averages of the drag force and the lift force caused by the vortex-induced vibration are larger than those in the stationary circular cylinder. Meanwhile, the time-varying curve is the waveform having larger irregularity than that in the sine forcible vibration of (4.3). The amplitude of the circular cylinder takes the largest value at the non-dimensional velocity Vr of 4 (the characteristic frequency fo of the circular cylinder being 1/4=0.25). This is considered to be related to the Strouhal number St of 0.25.

Figure 23:
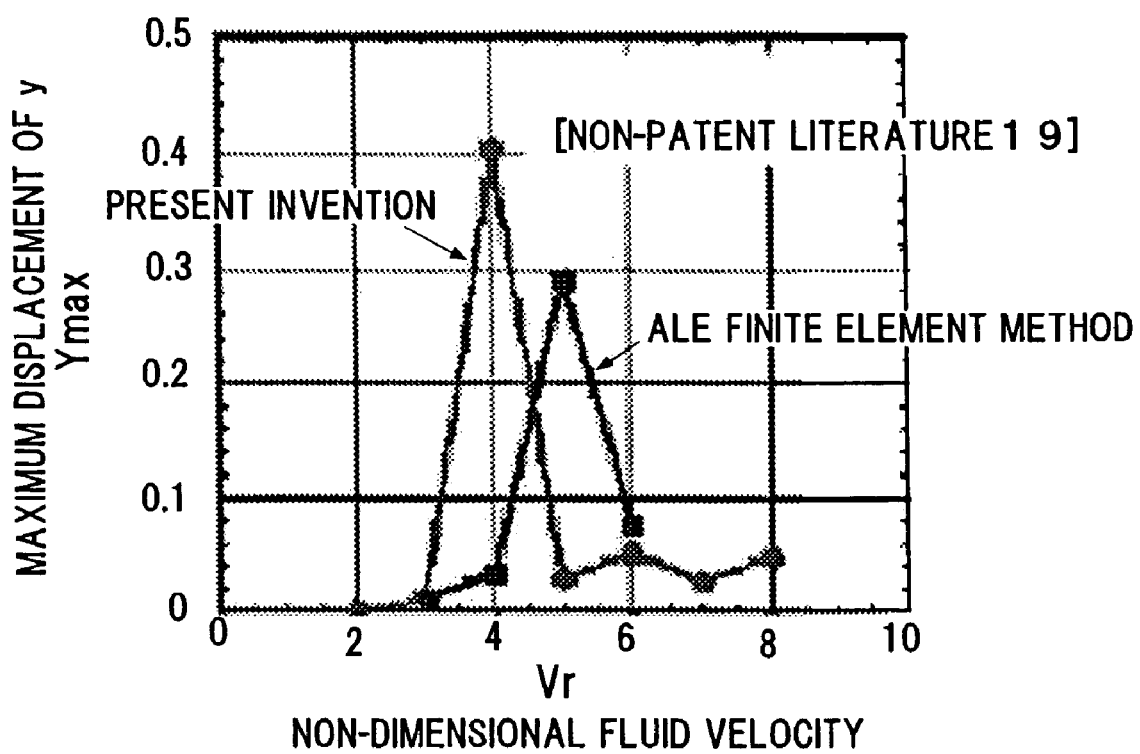
FIG. 23 shows the maximum displacement of y against the non-dimensional fluid velocity Vr.

FIG. 23 shows the maximum displacement of y against each value of the non-dimensional flow velocity. The maximum displacement of y gradually increases at the range of Vr=2, 3, 4, and takes the largest value at the point of Vr=4. Thereafter, accompanying the increase of Vr, the maximum displacement of y decreases in a waveform. It is confirmed that the varying tendency of the vortex-induced vibration response amplitude is qualitatively consistent with that in the calculation result by the ALE finite element method of the Non-Patent Literature 19 by Kondou et al.

5. Conclusion (1) We developed the fluid analysis method that directly uses the V-CAD data, and performed the benchmark test on the internal flow and the external flow. As a result of this, we confirmed that the fluid analysis method of the present invention has the sufficient stability, is superior to the conventional voxel method for the calculation on the flow around the two-dimensional circular cylinder, and has the calculation precision that is not inferior to that obtained by the boundary adaptive grid method.

(2) For the shape of the flow field, reading only the V-CAD data enables the numerical simulation of the two-dimensional incompressible viscous flow to be performed on any complicated shape in a short time.

(3) For the fluid-structure interaction vibration of the two-dimensional circular cylinder, in the case of the Reynolds number Re of 1000 in the flow around the circular cylinder, the lock-in region (fc/St=1) is expected to be the range of 0.15<fc<0.25.

Furthermore, it is demonstrated that the resonance state occurs due to the vortex self-excited vibration in the case of the Reynolds number Re of 1000, and the non-dimensional flow velocity Vr of 4, that is, when the characteristic frequency (fo=1/4) of the circular cylinder becomes equal to the Strouhal number (St=0.25) of the stationary circular cylinder.

These calculation results are qualitatively consistent with the experimental data and the results obtained by the ALE finite element method. Accordingly, the fluid analysis method of the present invention is effective even in the fluid-structure interaction problem for the moving boundary.

ADVANTAGES OF THE INVENTION

As described above, we developed the numerical analysis method for the incompressible viscous flow field of an arbitrary shape in which the V-CAD voxel data expected to be the next generation CAD is directly used. Furthermore, the cut cell finite volume method combined with the VOF method is used for the boundary of the flow field. Moreover, the method of the present invention was tested for the two-dimensional flows in the channel and around the circular cylinder. As a result of this, it was proved that the method of the present invention has a certain degree of precision and stability, and is a calculation method of practical use that does not spent much cost.

Thus, the numerical analysis method and device of the present invention that directly uses the V-CAD data can achieve the excellent advantages in that it is possible to completely automatize the grid generation, to easily express the object boundary, and to perform the high-precision simulation in a short time by the relatively simple calculation process.

What is claimed is:

1. A method for numerical analysis of a flow field of incompressible viscous fluid, directly using V-CAD data, comprising the steps of:

(A) dividing external data into a plurality of cells having boundaries orthogonal to each other, the external data including boundary data of an object that contacts incompressible viscous fluid;

(B) classifying the divided cells into an internal cell positioned inside or outside the object and a boundary cell including the boundary data;

(C) determining cut points in ridges of the boundary cell on the basis of the boundary data;

(D) determining a polygon connecting the cut points to be cell internal data for the boundary face;

(E) applying a cut cell finite volume method combined with a VOF method to a boundary of a flow field to analyze the flow field, wherein step (E) comprises the steps of:

i. applying a two-dimensional QUICK interpolation scheme to a convection term for space integral;

ii. applying a central difference having precision of a degree of a second order to a diffusion term;

iii. combining the convection term and the diffusion term, and applying an Adams-Bashforth method having precision of a degree of a second order to the combined convection term and diffusion term for time marching; and iv. applying a Euler implicit method having precision of a degree of a first order to a pressure gradient term for time marching, wherein for a two-dimensional boundary cell, a governing equation in the finite volume method is expressed by a governing equation (7), $$\int_{V_{i,j}} \int \frac{\partial \vec{u}}{\partial t} dV = -\int_{V_{i,j}} \int div(\vec{u} \otimes \vec{u}) dV - \int_{V_{i,j}} \int div(p\vec{I}) dV + \frac{1}{Re} \int_{V_{i,j}} \int div(grad(\vec{u})) dV, \quad (7)$$

wherein $$-\int_{V_{i,j}} \int div(\vec{u} \otimes \vec{u}) dV$$

corresponds to the convection term, $$-\int_{V_{i,j}} \int div(p\vec{I}) dV$$

corresponds to the pressure gradient term, and $$+\frac{1}{Re} \int_{V_{i,j}} \int div(grad(\vec{u})) dV$$

corresponds to the diffusion term, wherein $\vec{u}$ designates velocity of flow of viscous fluid, V designates differential volume of the viscous fluid, $p\vec{I}$ designates pressure p of the viscous fluid along the $\vec{I}$ vector, and Re corresponds to a non-dimensional Reynolds number; and (F) outputting to an output device a result of the method for numerical analysis of the flow field of incompressible viscous fluid, wherein the output device prints, or displays, or prints and displays, the result.

2. A method for numerical analysis of a flow field of incompressible viscous fluid, according to claim 1, wherein the convection term, the pressure gradient term and the diffusion term in the governing equation of the finite volume method are expressed by the equations (8), (9) and (10), respectively, convection term:

$$\int_{V_{i,j}} \int div(\vec{u} \otimes \vec{u}) dV = \oiint_{S_{1-5}} (\vec{u} \otimes \vec{u}) \cdot \vec{n} dS = \quad (8)$$

$$\sum_{m=1-5} (\vec{u} \otimes \vec{u})_m \cdot \vec{n} \delta S_m = [\Delta y(B_{i,j} u_{i,j}^{(x)} u_{i,j} - B_{i-1,j} u_{i-1,j}^{(x)} u_{i-1,j}) + \Delta x (A_{i,j} u_{i-1/2,j+1/2}^{(y)} v_{i,j} - A_{i,j-1} u_{i-1/2,j-1/2}^{(y)} v_{i,j-1})]$$

-continued $$\vec{i} + [\Delta y(B_{i,j}v^{(x)}_{i+1/2,j-1/2}u_{i,j} - B_{i-1,j}v^{(x)}_{i-1/2,j-1/2}u_{i-1,j}) +$$
$$\Delta x(A_{i,j}v^{(y)}_{i,j}v_{i,j} - A_{i,j-1}v^{(y)}_{i,j-1}v_{i,j-1})]\vec{j} \mid \text{only no-slip on wall}$$

pressure gradient term:

$$\int_{V_{i,j}}\int div(p\vec{I})dV = \oiint_{S_{1-5}}(p\vec{I})\cdot\vec{n}dS \tag{9}$$

$$= \sum_{m=1-5} p_m \vec{I}\cdot\vec{n}\delta S_m$$

$$= \Delta y[B_{i,j}p_{i+1/2,j} - B_{i-1,j}p_{i-1/2,j} -$$
$$p_p(B_{i,j} - B_{i-1,j})]\vec{i} + \Delta x[A_{i,j}p_{i,j+1/2} -$$
$$A_{i,j-1}p_{i,j-1/2} - p_p(A_{i,j} - A_{i,j-1})]\vec{j}$$

diffusion term:

$$\int_{V_{i,j}}\int div(grad(\vec{u}))dV = \oiint_{S_{1-5}} grad(\vec{u})\cdot\vec{n}dS = \tag{10}$$

$$\sum_{m=1-5} grad(\vec{u})_m \cdot \vec{n}\delta S_m = [\Delta y(B_{i,j}grad(u)^x_{i+1/2,j} -$$
$$B_{i-1,j}grad(u)^x_{i-1/2,j} - (B_{i,j} - B_{i-1,j})grad(u)^x_p) +$$
$$\Delta x(A_{i,j}grad(u)^y_{i,j+1/2} - A_{i,j-1}grad(u)^y_{i,j-1/2} -$$
$$(A_{i,j} - A_{i,j-1})grad(u)^y_p)]$$
$$\vec{i} + [\Delta y(B_{i,j}grad(v)^x_{i+1/2,j} - B_{i-1,j}grad(v)^x_{i-1/2,j} -$$
$$(B_{i,j} - B_{i-1,j})grad(v)^x_p) + \Delta x(A_{i,j}grad(v)^y_{i,j+1/2} -$$
$$A_{i,j-1}grad(v)^y_{i,j-1/2} - (A_{i,j} - A_{i,j-1})grad(v)^y_p)]\vec{j},$$

wherein $\Delta x$ is grid width in the x direction and $\Delta y$ is grid width in the y direction, and vectors $\vec{i}$ and $\vec{j}$ correspond to unit vectors in the x and y directions, $\vec{n}$ corresponds to a unit vector normal to the differential surface S, and wherein $A_{i,j}$, $A_{i,j-1}$, $B_{i,j}$, and $B_{i-1,j}$ are fractions of area of grid, and wherein u designates velocity of flow in the x direction and v designates velocity of flow in the y direction.

3. A method for numerical analysis of a flow field of incompressible viscous fluid, according to claim 1, wherein when a no-slip boundary condition is used for a solid boundary, a first integral is performed on the solid boundary with the convection term being zero, a value of a middle point P of a cut line segment is used as an average for the pressure gradient term and the diffusion term, and a space integral is performed with areas fractions being applied to all of the terms.

4. A method for numerical analysis of a flow field of incompressible viscous fluid, according to claim 1, wherein the boundary cell having the parameter smaller than a threshold value of VOF=0.01 is regarded as a complete solid, for the boundary cell having the parameter larger than the threshold value, a definition point for the parameter calculated in a cut cell is set at a center of the boundary cell, and a definition point for a parameter in a ridge is set at a center of a cell ridge, and a parameter at a middle point of a line segment is calculated by a linear interpolation.

5. A method for numerical analysis of a flow field of incompressible viscous fluid, according to claim 1, wherein a drag force in a flow direction and a lift force in a direction vertical to the flow, acting on the object, are expressed by equations (12) and (13) that respectively express drag force and lift force as follows, drag force:

$$F_x = F_D = \int_V\int\left(\frac{\partial\sigma_{xx}}{\partial x} + \frac{\partial\sigma_{xy}}{\partial y}\right)dxdy = \tag{12}$$

$$\int_V\int\left(\frac{\partial\sigma_{xx}}{\partial x}\right)dxdy + \int_V\int\left(\frac{\partial\sigma_{xy}}{\partial y}\right)dydx =$$

$$\oint_S\sigma_{xx}ds + \oint_S\sigma_{xy}ds = \int_{y_1}^{y_2}(\sigma_{xx}|_{f_1(y)} - \sigma_{xx}|_{f_2(y)})dy +$$

$$\int_{x_1}^{x_2}(\sigma_{xy}|_{g_1(x)} - \sigma_{xy}|_{g_2(x)})dx \bigg|_{\text{only Cartesian}}$$

lift force:

$$F_y = F_L = \int_V\int\left(\frac{\partial\sigma_{yx}}{\partial x} + \frac{\partial\sigma_{yy}}{\partial y}\right)dxdy = \tag{13}$$

$$\int_V\int\left(\frac{\partial\sigma_{yx}}{\partial x}\right)dxdy + \int_V\int\left(\frac{\partial\sigma_{yy}}{\partial y}\right)dydx =$$

$$\oint_S\sigma_{yx}ds + \oint_S\sigma_{yy}ds = \int_{y_1}^{y_2}(\sigma_{yx}|_{f_1(y)} - \sigma_{yx}|_{f_2(y)})dy +$$

$$\int_{x_1}^{x_2}(\sigma_{yy}|_{g_1(x)} - \sigma_{yy}|_{g_2(x)})dx \bigg|_{\text{only Cartesian}},$$

wherein, $F_x$ designates drag force in the x direction and $F_y$ designates lift force in the y direction and $\sigma$ designates a stress tensor at the surface of the object.

6. A method for numerical analysis of a flow field of incompressible viscous fluid, according to claim 1, wherein in fluid-structure interaction analysis accompanying a moving boundary, a fluid system and a structure system are separately analyzed for each predetermined time interval, and boundary conditions for the fluid system and the structure system are explicitly used.

7. A method for numerical analysis of a flow field of incompressible viscous fluid, according to claim 6, wherein in analysis on a forcibly vibrated circular cylinder, the circular cylinder is set as a one-mass-point and a one-degree-of-freedom system such that the circular cylinder is a solid structure elastically supported and vibrating in a direction vertical to the flow, and y-direction displacement of a center of the circular cylinder is given by equation (17), and a velocity boundary condition in the y-direction for a surface of the circular cylinder is given by equation (18), $$y = A\sin(2\pi f_C t) \tag{17}$$

$$v_W = A2\pi f_C \cos(2\pi f_C t), \tag{18}$$

wherein A designates amplitude of y-direction displacement y, $f_C$ designates frequency of forced vibration, and t designates time.

8. A method for numerical analysis of a flow field of incompressible viscous fluid, according to claim 7, wherein movement velocity of the vibrating circular cylinder obtained by the equation (18) is changed to be given for each calculation time step for the velocity boundary condition on the flow field.

9. A method for numerical analysis of a flow field of incompressible viscous fluid, according to claim 6, wherein in analysis on self-induced vibration due to a vortex shedding from the circular cylinder, a vibration equation having a dimension is expressed by equation (19) or equation (20), using a one-mass-point and a one-degree-of-freedom dumper/spring model, $$m\frac{d^2\tilde{y}}{dt^2} + c\frac{d\tilde{y}}{dt} + k\tilde{y} = \frac{1}{2}\rho U_o^2 D C_L \quad (19)$$

$$\frac{d^2y}{dt^2} + (4\pi hf_o)\frac{dy}{dt} + (2\pi f_o)^2 y = \frac{8h}{Sc}C_L, \quad (20)$$

wherein m designates mass of the circular cylinder, c designates a viscous damping coefficient, k designates an elastic recovery coefficient of the spring model, $\rho$ designates fluid density, $U_0$ designates velocity of the uniform flow, D designates a diameter of the circular cylinder, and $C_L$ designates a lift force coefficient, wherein $f_0$ designates a characteristic frequency, h designates a non-dimensional damping coefficient, Sc designates a Scriton number, and $y=A \sin(2\pi f_C t)$, wherein A designates amplitude of y-direction displacement y, $f_C$ designates frequency of forced vibration, and t designates time.

10. A method for numerical analysis of a flow field of incompressible viscous fluid, according to claim 9, wherein the movement velocity of the vibrating circular cylinder calculated by equation (20) is changed to be given for each calculation time step for the velocity boundary condition on the flow field.

11. A method for numerical analysis of a flow field of incompressible viscous fluid, according to claim 9, wherein initial displacement and initial velocity of the circular cylinder are set to be zero, the lift force is explicitly given by using a current value, and the vibration equation is integral by the Newmark's $\beta$ method to obtain vibration displacement and vibration velocity of the circular cylinder.

12. A device for numerical analysis of a flow field of incompressible viscous fluid, directly using V-CAD data, the device comprising:
  an input device for inputting external data including boundary data of an object that contacts incompressible viscous fluid;
  an external storage device for storing substantial data of shape data and physical property data integrated into each other, and a storage operational program for the substantial data;
  an internal storage device and a central processing device for executing the storage operational program; and
  an output device for outputting a result of execution of the storage operational program;
  wherein the device for numerical analysis
    (A) divides the external data into a plurality of cells having boundaries orthogonal to each other;
    (B) classifies the divided cells into an internal cell positioned inside or outside the object and a boundary cell including the boundary data;
    (C) determines cut points in ridges of the boundary cell on the basis of the boundary data;
    (D) determines a polygon connecting the cut points to be cell internal data for the boundary face; and
    (E) applies a cut cell finite volume method combined with a VOF method to a boundary of a flow field to analyze the flow field, wherein when the device for numerical analysis applies the cut cell finite volume method combined with a VOF method to the boundary of the flow field to analyze the flow field, the device for numerical analysis operates to
      i. apply a two-dimensional QUICK interpolation scheme to a convection term for space integral;
      ii. apply a central difference having precision of a degree of a second order to a diffusion term;
      iii. combines the convection term and the diffusion term, and applies an Adams-Bashforth method having precision of a degree of a second order to the combined convection term and diffusion term for time marching; and
      iv. applies a Euler implicit method having precision of a degree of a first order to a pressure gradient term for time marching,
  wherein for a two-dimensional boundary cell, a governing equation in the finite volume method is expressed by a governing equation (7), $$\int_{V_{i,j}}\int \frac{\partial \vec{u}}{\partial t}dV = -\int_{V_{i,j}}\int div(\vec{u}\otimes\vec{u})dV - \int_{V_{i,j}}\int div(p\vec{I})dV + \frac{1}{Re}\int_{V_{i,j}}\int div(grad(\vec{u}))dV, \quad (7)$$

wherein $$-\int_{V_{i,j}}\int div(\vec{u}\otimes\vec{u})dV$$

corresponds to the convection term, $$-\int_{V_{i,j}}\int div(p\vec{I})dV$$

corresponds to the pressure gradient term, and $$+\frac{1}{Re}\int_{V_{i,j}}\int div(grad(\vec{u}))dV$$

corresponds to the diffusion term, wherein $\vec{u}$ designates velocity of flow of viscous fluid, V designates differential volume of the viscous fluid, $p\vec{I}$ designates pressure p of the viscous fluid along the $\vec{I}$ vector, and Re corresponds to a non-dimensional Reynolds number.

13. A computer readable medium comprising a program stored thereon for numerical analysis of a flow field of incompressible viscous fluid, directly using V-CAD data, wherein the program causes a computer to perform the steps of:
  (A) dividing external data into a plurality of cells having boundaries orthogonal to each other, the external data including boundary data of an object that contacts incompressible viscous fluid;

(B) classifying the divided cells into an internal cell positioned inside or outside the object and a boundary cell including the boundary data;
(C) determining cut points in ridges of the boundary cell on the basis of the boundary data;
(D) determining a polygon connecting the cut points to be cell internal data for the boundary face; and
applying a cut cell finite volume method combined with a VOF method to a boundary of a flow field to analyze the flow field, wherein step (E) comprises the steps of
   i. applying a two-dimensional QUICK interpolation scheme to a convection term for space integral;
   ii. applying a central difference having precision of a degree of a second order to a diffusion term;
   iii. combining the convection term and the diffusion term, and applying an Adams-Bashforth method having precision of a degree of a second order to the combined convection term and diffusion term for time marching; and
   iv. applying a Euler implicit method having precision of a degree of a first order to a pressure gradient term for time marching,
wherein for a two-dimensional boundary cell, a governing equation in the finite volume method is expressed by a governing equation (7), $$\int_{V_{i,j}} \int \frac{\partial \vec{u}}{\partial t} dV = -\int_{V_{i,j}} \int div(\vec{u} \otimes \vec{u}) dV - \int_{V_{i,j}} \int div(p\vec{I}) dV + \frac{1}{Re} \int_{V_{i,j}} \int div(grad(\vec{u})) dV, \quad (7)$$

wherein $$-\int_{V_{i,j}} \int div(\vec{u} \otimes \vec{u}) dV$$

corresponds to the convection term, $$-\int_{V_{i,j}} \int div(p\vec{I}) dV$$

corresponds to the pressure gradient term, and $$+\frac{1}{Re} \int_{V_{i,j}} \int div(grad(\vec{u})) dV$$

corresponds to the diffusion term, wherein $\vec{u}$ designates velocity of flow of viscous fluid, V designates differential volume of the viscous fluid, $p\vec{I}$ designates pressure p of the viscous fluid along the $\vec{I}$ vector, and Re corresponds to a non-dimensional Reynolds number; and
   (F) outputting to an output device a result of the method for numerical analysis of the flow field of incompressible viscous fluid, wherein the output device prints, or displays, or prints and displays, the result.

* * * * *